Figure 1:
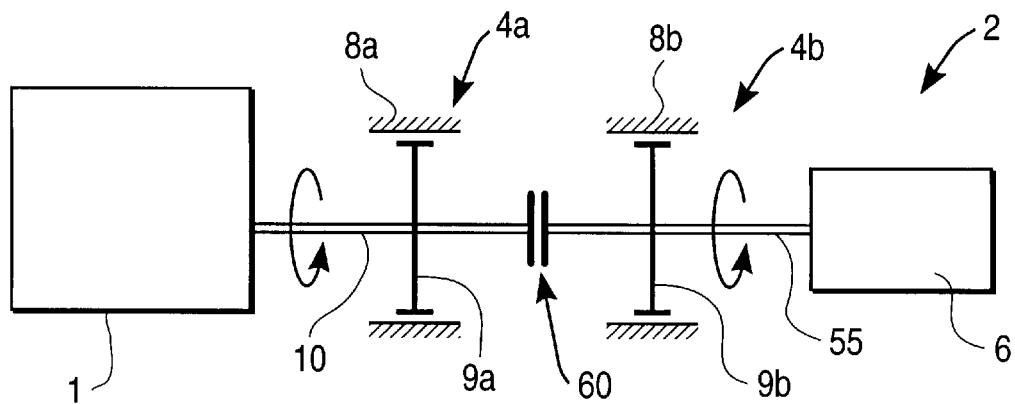

United States Patent [19]
Masberg et al.

[11] Patent Number: 6,149,544
[45] Date of Patent: *Nov. 21, 2000

[54] DRIVE SYSTEM FOR A MOTOR VEHICLE WITH A DRIVE UNIT AND ELECTRIC MACHINE, AND METHOD OF OPERATING THE SYSTEM

[75] Inventors: Ullrich Masberg, Rösrath; Thomas Pels, Overath; Klaus-Peter Zeyen, Köln; Andreas Gründl, München; Bernhard Hoffmann, Starnberg, all of Germany

[73] Assignees: ISAD Electronic Systems GmbH & Co. KG, Cologne; Grundl und Hoffmann GmbH, Starnberg, both of Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/029,516
[22] PCT Filed: Aug. 31, 1996
[86] PCT No.: PCT/DE96/01616
  § 371 Date: Jan. 19, 1999
  § 102(e) Date: Jan. 19, 1999
[87] PCT Pub. No.: WO97/08007
  PCT Pub. Date: Mar. 6, 1997

[30] Foreign Application Priority Data
Aug. 31, 1996 [DE] Germany .................. 195 32 136

[51] Int. Cl.[7] .......................... H02P 15/02; B60K 41/02; B60K 1/00; F16H 3/72
[52] U.S. Cl. .................... 477/13; 477/5; 475/5; 180/65.2
[58] Field of Search ................ 475/1, 5; 477/2, 477/3, 5, 6, 7, 8, 13; 180/65.2, 65.4

[56] References Cited

U.S. PATENT DOCUMENTS

| | | | |
|---|---|---|---|
| 2,654,849 | 10/1953 | Trofimov | 310/99 |
| 2,790,917 | 4/1957 | Trofimov | 310/102 |
| 3,774,303 | 11/1973 | Burkett et al. | 30/382 |
| 3,870,116 | 3/1975 | Seliber | 180/54 R |
| 3,902,073 | 8/1975 | Lafuze | 290/46 |
| 3,974,396 | 8/1976 | Schönball | 290/54 |

(List continued on next page.)

FOREIGN PATENT DOCUMENTS

| | | |
|---|---|---|
| 58401-73 | 1/1975 | Australia . |
| 0 151 935 A1 | 8/1985 | European Pat. Off. . |
| 0 175 952 A2 | 4/1986 | European Pat. Off. . |
| 0 233 738 A1 | 8/1987 | European Pat. Off. . |
| 0 338 485 A2 | 10/1989 | European Pat. Off. . |
| 0 354 790 A2 | 2/1990 | European Pat. Off. . |

(List continued on next page.)

OTHER PUBLICATIONS

N. Saridakis, "Golf mit Otto–Elektro–Hybridantrieb", ATZ, Automobilitechnische Zeitschrift 87 (1985) 11, pp. 581–584.

H. Baumann, "Siedekühlgetfäss mit Luftrückkühlung für Traktionsstromrichter hoher Leistung", etz–Archiv, vol. 11, 1989, No. 7, pp. 213–230.

(List continued on next page.)

Primary Examiner—Charles A Marmor
Assistant Examiner—Roger Pang
Attorney, Agent, or Firm—Blakely, Sokoloff, Taylor & Zafman LLP

[57] ABSTRACT

The invention concerns a drive system, especially for a motor vehicle, with a drive assembly, especially an internal combustion engine (1); and at least one electric machine (4), which acts as an electromagnetic coupling in the drive train (2) of the drive system and/or as an active transmission synchronization device. The invention is also oriented to a method of operating a drive system.

19 Claims, 7 Drawing Sheets

6,149,544
Page 2

U.S. PATENT DOCUMENTS

| | | | |
|---|---|---|---|
| 4,025,860 | 5/1977 | Shibata et al. | 320/3 |
| 4,066,936 | 1/1978 | Hirota | 318/139 |
| 4,335,429 | 6/1982 | Kawakatsu | 180/65 A X |
| 4,346,773 | 8/1982 | Hofbauer et al. | 180/165 |
| 4,499,965 | 2/1985 | Oetting et al. | 180/165 |
| 4,533,011 | 8/1985 | Heidemeyer et al. | 180/65.2 |
| 4,699,097 | 10/1987 | Tanaka et al. | 123/192 |
| 4,797,602 | 1/1989 | West | 322/10 |
| 4,803,376 | 2/1989 | N'Guyen | 290/22 |
| 4,883,973 | 11/1989 | Lakey et al. | 290/31 |
| 4,942,950 | 7/1990 | Watanabe et al. | 192/0.096 |
| 4,958,095 | 9/1990 | Uchida et al. | 310/59 |
| 5,053,632 | 10/1991 | Suzuki et al. | 290/45 |
| 5,109,815 | 5/1992 | Maeda et al. | 123/192.1 |
| 5,125,236 | 6/1992 | Clancey et al. | 62/115 |
| 5,126,641 | 6/1992 | Putman et al. | 318/128 |
| 5,303,794 | 4/1994 | Hrovat et al. | 180/197 |
| 5,323,743 | 6/1994 | Kristiansson | 123/179.3 |
| 5,325,042 | 6/1994 | Murugan | 322/10 |
| 5,359,308 | 10/1994 | Sun et al. | 335/216 |
| 5,431,241 | 7/1995 | May et al. | 180/197 |
| 5,565,723 | 10/1996 | Dastidar | 310/103 |
| 5,789,823 | 8/1998 | Sherman | 475/5 |
| 5,845,731 | 12/1998 | Buglione et al. | 180/65.2 |
| 5,905,346 | 5/1999 | Yamada et al. | 477/13 X |

FOREIGN PATENT DOCUMENTS

| | | |
|---|---|---|
| 0 385 311 A2 | 9/1990 | European Pat. Off. |
| 0 427 568 A1 | 5/1991 | European Pat. Off. |
| 0 437 266 A2 | 7/1991 | European Pat. Off. |
| 0 440 088 A1 | 8/1991 | European Pat. Off. |
| 0 530 659 A1 | 3/1993 | European Pat. Off. |
| 0 557 522 A1 | 9/1993 | European Pat. Off. |
| 0 569 347 A2 | 11/1993 | European Pat. Off. |
| 0 604 979 A2 | 7/1994 | European Pat. Off. |
| 0 612 928 A1 | 8/1994 | European Pat. Off. |
| 2481656 | 11/1981 | France. |
| 2563280 | 10/1985 | France. |
| 282 671 | 8/1912 | Germany. |
| 874 713 | 6/1952 | Germany. |
| 893 299 | 1/1953 | Germany. |
| 904 737 | 6/1953 | Germany. |
| 938 680 | 6/1954 | Germany. |
| 1 077 072 | 3/1960 | Germany. |
| 1 156 319 | 10/1963 | Germany. |
| 1 165 422 | 3/1964 | Germany. |
| 1 284 853 | 12/1968 | Germany. |
| 23 45 018 A1 | 4/1974 | Germany. |
| 23 53 724 B2 | 5/1974 | Germany. |
| 27 04 533 A1 | 8/1978 | Germany. |
| 28 55 886 A1 | 6/1979 | Germany. |
| 29 02 376 C2 | 7/1979 | Germany. |
| 28 23 225 A1 | 11/1979 | Germany. |
| 29 17 139 A1 | 11/1980 | Germany. |
| 29 43 563 A1 | 5/1981 | Germany. |
| 30 09 503 A1 | 9/1981 | Germany. |
| 30 13 424 A1 | 10/1981 | Germany. |
| 30 48 972 C2 | 7/1982 | Germany. |
| 30 50 269 A1 | 10/1982 | Germany. |
| 32 30 121 A1 | 2/1984 | Germany. |
| 32 30 607 A1 | 2/1984 | Germany. |
| 32 43 513 A1 | 5/1984 | Germany. |
| 33 43 018 C2 | 6/1984 | Germany. |
| 32 43 514 C2 | 9/1984 | Germany. |
| 33 35 923 A1 | 9/1984 | Germany. |
| 33 38 548 A1 | 5/1985 | Germany. |
| 35 37 994 A1 | 5/1986 | Germany. |
| 37 37 192 A1 | 7/1988 | Germany. |
| 38 14 484 A1 | 11/1988 | Germany. |
| 37 43 289 A1 | 6/1989 | Germany. |
| 38 12 296 A1 | 11/1989 | Germany. |
| 39 37 082 A1 | 5/1990 | Germany. |
| 39 26 054 A1 | 2/1991 | Germany. |
| 40 27 664 A1 | 3/1991 | Germany. |
| 39 39 695 C1 | 5/1991 | Germany. |
| 40 38 301 A1 | 6/1991 | Germany. |
| 40 00 678 A1 | 7/1991 | Germany. |
| 41 00 937 A1 | 8/1991 | Germany. |
| 40 11 291 A1 | 10/1991 | Germany. |
| 41 34 268 A1 | 4/1992 | Germany. |
| 42 13 132 A1 | 11/1992 | Germany. |
| 41 24 496 A1 | 1/1993 | Germany. |
| 42 02 083 A1 | 7/1993 | Germany. |
| 42 02 737 A1 | 8/1993 | Germany. |
| 42 30 510 C1 | 9/1993 | Germany. |
| 42 25 683 A1 | 2/1994 | Germany. |
| 43 30 193 A1 | 3/1994 | Germany. |
| 43 18 949 C1 | 6/1994 | Germany. |
| 43 39 252 A1 | 6/1994 | Germany. |
| 43 91 898 C2 | 6/1994 | Germany. |
| 43 44 053 A1 | 7/1994 | Germany. |
| 43 11 697 A1 | 10/1994 | Germany. |
| 43 14 290 A1 | 11/1994 | Germany. |
| 43 23 601 A1 | 1/1995 | Germany. |
| 43 23 602 A1 | 1/1995 | Germany. |
| 44 04 791 C1 | 3/1995 | Germany. |
| 295 02 906 U | 4/1995 | Germany. |
| 44 02 152 C1 | 4/1995 | Germany. |
| 44 37 322 A1 | 5/1995 | Germany. |
| 44 21 512 C1 | 6/1995 | Germany. |
| 44 08 719 C1 | 7/1995 | Germany. |
| 44 23 577 A1 | 8/1995 | Germany. |
| 44 12 945 A1 | 10/1995 | Germany. |
| 44 12 438 C1 | 11/1995 | Germany. |
| 55-005454 | 1/1980 | Japan. |
| 58-126434 | 7/1983 | Japan. |
| 59-184020 | 10/1984 | Japan. |
| 61-066820 | 8/1986 | Japan. |
| 61-200333 | 9/1986 | Japan. |
| 62-166749 | 7/1987 | Japan. |
| 1113571 | 5/1989 | Japan. |
| 1-190922 | 8/1989 | Japan. |
| 4024156 | 1/1992 | Japan. |
| 05211258 | 8/1993 | Japan. |
| 07105943 | 4/1995 | Japan. |
| 20 42 772 | 9/1980 | United Kingdom. |
| WO 88/08636 | 11/1988 | WIPO. |
| WO 91/16538 | 10/1991 | WIPO. |
| WO 94/19856 | 9/1994 | WIPO. |
| WO 95/02758 | 1/1995 | WIPO. |
| WO 95/24072 | 9/1995 | WIPO. |

OTHER PUBLICATIONS

E. Blessman, "Magnetic Couplings", Machine Design, Feb. 9, 1989, pp. 105–108.

Robert Bosch GmbH, "Kraftfahrtechnisches Taschenbuch", VDI–Verlag, Düsseldorf, 21 ed 1991, pp. 346–347; 361;555–559; 763–767.

H. Deisenroth, C. Trabert: "Vermeidung von Überspannungen bei Pulsumrichterantrieben"etz, vol. 114, 1993, No. 17, pp. 1060–1067.

W. Geissler, F. Ungen–Weber: "Modelling the Three–Phase Propulsion System of a Modern Multisystem–Locomotive", EPE Firenze, (1991), pp. 4–632 –4–637.

G. und H. Häberle, "Elektrische Maschinen in Anlagen der Energietechnik", Verlag Europa–Lehrmittel, Haan–Gruiten, 3 Auflage, 1994, Seiten 169–172.

G. Henneberger, "Elektrische Motoraustrüstung", Braunschweig, 1990, pp. 98–103.

J. Langheim, J. Fetz; "ElectricCitybus two Induction Motors–Power Electronics and Motor Control", ETEP, vol. 2, No. 6, Nov./Dec. 1992, pp. 359–365.

"Kraftfahrzeugtechnik" Nov. 1982, pp. 346–347.

Litton Precision Products, Litton Servotechnik, "Bürstenloser Hohlwellen–Resolver Brushless Resolver", SSBH–15, Unterföhring.

J. Reinert et al., "digital Control and Optimization of a Rolling Rotor Switched Reluctance Machine", IEEE Transactions on Industry Application s, vol. 31, No. 2, Mar./Apr. 1995, pp. 338–344.

F. Simovert, "Spannungszwischenkresis–Umrichter Baureihe 6SC44.. der Fa. Siemens AG", 1985, No. A 19100–E319–A262.

D. Teodorescu, "Kleinantriebe mit Vollpolläufer–Synchronmotoren", ema, May 1993, pp. 39–43.

English Translation Abstract of German language cited "Other Art", pp. 9 total.

DRIVE SYSTEM FOR A MOTOR VEHICLE WITH A DRIVE UNIT AND ELECTRIC MACHINE, AND METHOD OF OPERATING THE SYSTEM

The invention concerns a drive system, especially for a motor vehicle.

Traditionally, one uses friction-closure couplings in drive systems of motor vehicles, which enable a starting of the vehicle with torque transformation ("grinding clutch") in the starting phase. A further task consists in allowing a gear shifting by separating the drive assembly from a shift transmission and subsequent reconnection with an adjustment of the rotary speed of drive assembly and transmission provided by friction. Furthermore, they serve as overload protection and vibration dampening. These frictional couplings are highly strained wearing parts, which need to be constantly monitored and sometimes fine-tuned. In event of above-average strain, such as when used excessively in city traffic or with rough driving style, they sometimes do not last as long as the vehicle and need to be replaced prematurely. The operation of a friction coupling is especially complicated for the beginning driver. Even experienced drivers do not always manage a smooth starting and shifting, which means not only a loss of comfort, but also a special burden on the drive assembly and other parts of the drive system. In danger situations, a (not always avoidable) "stalling" of the drive assembly when starting represents a substantial risk of accident.

Moreover, hydrodynamic clutches are known, some of them with a transformer function. These generally allow an almost jerk-free starting and shifting with easy operation. However, they are quite costly to build. They have limited controllability; e.g., a complete shaft separation is often not achievable, so that the vehicle creeps when idling (in the park position/position D). Moreover, they have not inconsiderable losses.

When shifting from one gear to another, the transmission parts being joined together must first be brought into synchronism (i.e., the same rotary speed or the same circumferential velocity, depending on the type of transmission). In claw-shifted transmissions, which are sometimes used for heavy commercial vehicles—this is done by the driver by double clutching (upshifting) or double declutching (backshifting), which demands much driving skill. In most traditional transmissions, the synchronization is done mechanically during the shift motion, namely, by frictional precoupling for the force-closure equalization of rotary speeds, wherein the positive-locking shifting of the gear is made possible by a locking mechanism only after the synchronization process is completed. Conical rings, for example, can serve as the frictional precoupling. Synchronized transmissions are expensive in design and structure. The synchronization mechanisms are highly stressed and subject to wear. The forces necessary for the synchronization must be applied by the driver when activating the shift, which can be felt by relatively high shifting force. Furthermore, the synchronization process takes a certain time, which generally gives the shift actuation a tough feeling. These properties of the shift operation mean that even experienced drivers—even when conscious activity is no longer demanded of them—must devote a not inconsiderable amount of attention to shifting, which should properly be devoted to events on the road. Thus, this also is quite detrimental to traffic safety.

The following publications are cited as to the state of the art: DE 904 737, U.S. Pat. No. 2,654,849; DE 893 299; DE 1 077 072; DE 1 165 422; DE 874 713; DE 1 284 853; E. Blessmann: "Magnetic Couplings," Machine Design, Feb. 9, 1989, 105–108; DE 2 345 018; DE 43 39 252 A1; DE 43 23 602 A1; DE 29 43 563 A1; DE 43 18 944 C1; DE 37 37 192 A1; DE 35 37 994 A1; DE 41 34 268 A1; DE 43 30 193 A1; U.S. Pat. No. 3,870,116; FR 2 481 656; DE 32 43 513 C2; DE 42 02 083 C2, DE 42 02 737 A1; DE 1 156 319; DE 43 44 053 A1; DE 30 48 972 C2; Patent Abstracts of Japan, M-359, Feb. 22, 1985, Vol. 9, No. 42 8 JP 59-184020; DE 33 38 548 A1; DE 44 08 719 A1; DE 938 680; DE 282 671; U.S. Pat. No. 2,790,917.

The purpose of the invention is to further develop the above-mentioned drive systems.

It accomplishes this purpose through a drive system, especially for a motor vehicle, with
- a drive assembly, especially an internal combustion engine; and
- at least one electric machine, which acts as an electromagnetic coupling in the drive train of the drive system and/or as an active transmission synchronization device (claim 1).

An "electric machine" is any kind of machine for rotational movements, which can operate as an electric motor and/or as an electric generator.

Preferably, the electric machine—similar to a frictional coupling—sits directly on the shafts, whose coupling or separation is accomplished by it.

The term "coupling" is understood in a broad sense in connection with electromagnetic coupling: it encompasses the meaning of "coupling" in the narrow sense, which serves exclusively to transmit rotary speed and torque unchanged (such as a positive-closure coupling), as well as that of "transformer," which permits a transformation of rotary speed and/or torque (such as a friction-closure or a hydrodynamic coupling).

In an "electromagnetic coupling," the transmission of torque occurs through the coupling by electrical, magnetic, or electromagnetic forces. It is possible for this type of force transmission to occur only temporarily, for example, after achieving the same rotary speed for the shafts being coupled the force transmission can be taken over by a mechanical coupling. Such a combined coupling shall also be termed an "electromagnetic coupling."

In an "active transmission synchronization," the acceleration or braking of one of the transmission parts being connected to achieve the synchronization does not occur passively by precoupling with the other transmission piece. Instead, the electric machine accelerates or brakes the freewheeling member of the two transmission pieces by actively shifting into the synchronized condition, without this requiring a coupling or precoupling with the other transmission piece. No mechanical synchronization elements are necessary (precoupling, conical rings, etc.). The required synchronization speed can be determined very quickly, e.g., by detecting the instantaneous speed of the transmission takeoff shaft based on known transmission ratios of the various transmission parts being connected, as soon as it becomes clearly evident which gear should be engaged by entering a particular shift track during the shift operation. The synchronization can occur in the interval of time available until the end of the shift path is reached—when the connection of the transmission pieces occurs. Thus, the synchronization occurs without shifting force and without noticeable delay in the shift operation.

Especially advantageously, the drive system combines the functions of electromagnetic coupling and active synchronization device. For example, in more simple drive systems, each of these functions can be advantageous in itself.

The drive system according to the invention has the following advantages:

- the electromagnetic coupling and/or the active synchronization device are not subject to any wear or any maintenance;
- the electromagnetic coupling enables the precise adjustment of any given torque being transmitted, i.e., the adjustment of any desired coupling slip, and is therefore superior in its control engineering to other known couplings;
- the variation in the coupling slip over time can also be controlled at will, which enables a completely uniform and automatic transition from maximum slip to vanishing slip;
- this makes the operation of the vehicle easier, even for unskilled drivers, starting and/or shifting is totally jolt-free, stalling of the drive assembly is prevented, which is a savings for traffic safety on the whole;
- with active transmission synchronization, the transmission can be designed and built much more simply;
- shifting can occur with less force and no noticeable time delay, thus allowing the driver to devote more attention to the road;
- a fading of the coupling, i.e., a change in its physical properties due to overheating, can be prevented.
- the torque jump common in traditional mechanical couplings when changing from sliding friction to adhesion can be avoided; moreover, this eliminates so-called "clutch grabbing" during periodic alternation of adhesion and sliding friction;
- a weight advantage (lower weight) can be achieved, since the heavy pressure plate of a traditional mechanical coupling is eliminated;
- with the drive system according to the invention, different coupling characteristics or torque curves over the coupling time can be adjusted by means of software; in particular, the clutch process can also be automatic;
- the electric machine acting as the coupling requires fewer parts than a traditional mechanical coupling; thus, manufacturing expenses can be reduced;
- energy can be recovered by generator type braking of the shaft during shifting; whereas the brake energy is turned into heat in a traditional mechanical coupling, the brake energy in the electric machine working as a clutch can be transformed into electrical energy.

On the whole, the drive system according to the invention enhances driving comfort, simplifies operation of the vehicle, and contributes to enhanced traffic safety.

In a first advantageous embodiment, the drive system comprises two electric machines for the function of the electromagnetic coupling and/or the transmission synchronization device, i.e., a dual electric machine. In normal operation—when the drive momentum produces torque via the drive train—the first electric machine functions as a generator and the second as a motor, while the electric energy needed to operate the motor is essentially derived from the generator. Thus, in this configuration, the mechanical rotational energy furnished by the drive is first transformed into electric current by a pair of relatively rotating electromagnetic active surfaces (stator and rotor of the first electric machine) and then changed back by a second pair of relatively rotating electromagnetic active surfaces (stator and rotor of the second electric machine) into mechanical rotational energy, possibly at different rotary speed and with different torque. The quantum of energy put out by the first machine can be larger or smaller than that taken up by the second machine. The excess or deficit can be saved in an energy accumulator or withdrawn from such, respectively.

Although the configuration of the coupling as a dual electric machine requires a certain expense, it allows relatively easily controllable and in particular very diversified operational possibilities. If the two electric machines are independently controllable, they can in fact fulfill different additional functions at the same time and independently. For example, the first machine can produce an additional alternating torque for active reduction of rotational nonuniformities of the drive assembly's drive shaft during the clutch process or the synchronization (produced by the second machine).

Especially advantageously for achieving a compact and easily configured dual unit, the two machines are coaxially arranged and/or have one or more parts in common, such as a stator body and/or a housing. This also facilitates the possibility of making the machines additionally mechanically coupleable to a bridging clutch.

In the other advantageous configuration, the coupling is formed by one electric machine, i.e., a single machine, which has at least two rotary electromagnetic active units, one of which is coupled or can be coupled to a torque transmitter at the drive end and the other to a torque transmitter at the takeoff end. The torque transmitters are generally a drive shaft and a takeoff shaft, say, the drive shaft of the drive assembly or a shaft coupled to it and the shaft leading from the electric machine to the transmission. The electromagnetic active units correspond to the rotor and stator of the normal electric machine, but with the difference that the stator as well as the rotor can turn here. Thus, the machine corresponds to a normal machine with rotor and stator, wherein the machine can turn as a whole in addition to the rotor's rotation. The rotating machine can generate positive and negative relative torques between rotor and (movable) stator. In this way, the clutch slip can be influenced and various clutch effects can be achieved: for example, the electric machine can be regulated such that a relative torque is adjusted between rotor and stator, which corresponds to that being transmitted at the moment in the drive train, so that the clutch slip vanishes (zero clutch slip). The electric machine then transmits rotary speed and torque unchanged—corresponding to a closed mechanical coupling. But the electric machine can also be regulated such that the relative torque between rotor and stator vanishes and a clutch slip corresponding to the relative rotary speed of the torque transmitters is adjusted. In this way, one accomplishes a complete separation of them without torque transmission—corresponding, say, to a completely opened mechanical coupling. Clutch slip values lying between these two extremes can also be achieved by appropriate actuation of the electric machine. Furthermore, the electric machine also advantageously exploits torque transmission regions beyond the one exploited by a conventional frictional clutch: through suitable actuation of the electric machine, torques can be connected in, i.e., a torque in or opposite the direction of turning of the torque transmitter. Thus, both negative clutch slip values can be adjusted by creating a driving torque in addition to the drive assembly, and clutch slip values greater than one—by creating a braking torque directed opposite the drive assembly.

The rotary mechanical energy furnished by the drive is therefore handed on directly in the form of rotary mechanical energy by a pair of relatively rotating electromagnetic active surfaces with adjustable slip in this other configuration. Only the excess or deficit existing because of slip is transformed from mechanical to electrical energy or vice versa in this case, and it can be saved in an accumulator for electrical energy or withdrawn from such, respectively. If the excess energy and/or power exceeds the holding capacity of the accumulator—which can occur, for example, when starting with "grinding" clutch—the energy can also be dissipated, e.g., in the form of heat (through heating resistors, etc.).

The synchronization function—i.e., acceleration or braking of the torque transmitter at the takeoff end with gear disengaged—occurs in this configuration with an electric machine thrusting against the torque transmitter at the drive end, rotating with variable rotary speed. Its particular rotary speed at the moment is considered when determining the relative rotary speed between the active elements necessary to accomplish the synchronization.

In the electromagnetic coupling—unlike the hydrodynamic coupling—a vanishing clutch slip can be adjusted. For example, one accomplishes this in an induction machine through a rotary field generated by one of the active units (e.g., the rotating stator), which turns relative to the active unit and exerts a torque on the other active unit by the thus generated electromagnetic slip, equal in magnitude to the instantaneous drive moment, but opposite in direction, and thus causing a vanishing of the clutch slip. In a synchronous machine, no electromagnetic slip is necessary—here, the rotary field at the limit of vanishing clutch slip changes into a static magnetic field—relative to the active unit (e.g., the rotating stator). A certain energy must be expended to cause the clutch slip to vanish, e.g., in order to generate the rotary field with electromagnetic slip or the static field. To minimize this loss energy, the torque transmitter which separates the electromagnetic coupling can be connected advantageously to a bridge coupling, especially a mechanical coupling. This may involve, for example, a friction-closure coupling or—since it can always be coupled in by appropriate control with vanishing clutch slip—advantageously a positive-closure coupling, such as a claw clutch. Instead of providing a separate coupling, it is also possible to bring the two rotors of the dual machine or the two active units of the single machine into friction or positive closure with each other by axial shifting.

A number of additional functions of the electric machine can be achieved advantageously or even exclusively with stator locked against rotation. In order to exploit some or all of these additional functions with the rotating single machine as well, the action of at least one of its two electromagnetic active units is advantageously replaceable by the action of a nonrotating active unit. The replacement can occur when no coupling function is required, i.e., when the vehicle is taken out of gear (at standstill or during shifting) or when the bridge coupling (if present) is closed. There are various advantageous possibilities for the nature and manner of this replacement of action:

In a first, very simple possibility, the replacement of action is accomplished in that at least one of the rotating active units, especially the one at the takeoff end (i.e., at the transmission), can be restrained from rotating, in particular, by means of a mechanical brake or coupling. Thus, it is not that the rotating active unit is replaced by a stationary one, but rather the different actions are produced by one and the same active unit, which is merely fixated and then released. The fixation can be direct or indirect, say, by fixation of the corresponding torque transmitter. A fixation at the takeoff end—which is generally only possible with the gear disengaged (in particular, the vehicle in standstill)—provides two functions, namely, first, an active reduction of rotational nonuniformities of the drive shaft (at the drive end) by applying a rapidly alternating torque, which is generated substantially opposite in phase to the rotational nonuniformities of the drive assembly, for example, and secondly, a starting of the drive assembly by merging in from standstill (so-called direct starting).

A second type of replacement of action exploits additional functions in the driven state of the system, namely, when operating with closed bridge coupling and during shifting. The replacement of action occurs in that at least one of the active rotating units can be decoupled from its torque transmitter and restrained from turning, in particular, by means of one or more mechanical couplings. Here as well, the different actions are produced by one and the same active unit, which is merely fixated and decoupled from its torque transmitter and then released and coupled to its torque transmitter. The difference from the former type consists in the additional capability of decoupling the fixated unit from its torque transmitter. This allows—unlike the former type—a fixation of the active element even when the corresponding torque transmitter is rotating, i.e., even in the driving condition of the system. The mechanical couplings for fixation and decoupling can advantageously be positive-locking, since the fixated unit after being decoupled can be brought to a halt by the electric machine itself, so that its fixation is then possible by a positive-closure coupling. Accordingly, for coupling to the torque transmitter, it can be brought up to the rotary speed of the latter. This second method exploits the function of an active reduction of rotational nonuniformities of the drive shaft (at the drive end) even in the driving condition. Moreover, it allows implementation of the synchronization function by thrusting against the fixated element, which is easier to control than the aforesaid case of a thrusting against the torque transmitter at the drive end, turning with variable rotary speed. A precondition for the latter, however, is that the bridge coupling (or a different additional coupling) be arranged such as to allow a separation of the still rotating element from the drive assembly.

The third type of replacement of action corresponds in its outcome to the second type. In contrast with it, however, is the fact that its electromagnetic active unit whose action is to be replaced is present twice, namely, as a rotating and a nonrotating active unit. The replacement of action occurs in that the rotating active unit is made electromagnetically inactive and the nonrotating one is made active, preferably by switching the supply of torque-generating or torque-transmitting electric energy from the rotating to the nonrotating active unit. Advantageously, an appropriately switchable rectifier or inverter is used for this.

If, in this machine, the stationary active unit which is present in addition to the (first) rotating active unit is actuated such that it can exert, at the same time as that active unit, an independent action on the other (second) rotating active unit, one obtains a machine with further functional capabilities. Advantageously, one accomplishes this actuation by independently supplying torque-generating or torque-transmitting electrical energy to the first rotating and the nonrotating active unit, e.g., by two basically independent rectifiers or inverters. With this configuration, in particular, it is possible to actively reduce rotational nonuniformities of the torque transmitter at the drive end, even when the electromagnetic coupling function is activated (e.g., when the bridge coupling is open or absent). A precondition for the additional function is that the second rotary unit is coupled to the torque transmitter at the drive end.

Advantageously, the coupling function of the electric machine(s) comprises the functions of a starting clutch and/or shifting clutch. In the case of a functioning as starting clutch, the electric machine must be able to produce high power, which requires a correspondingly large dimensioning of the overall system. Moreover, the energy excess during the starting with large clutch slip can take on rather large values. Therefore, in smaller dimensioned electric machines and when the energy accumulation capability is not enough, it can be advantageous to restrict the electromagnetic coupling function to the shift function and to leave the starting clutch function—when the electromagnetic coupling is bridged over—to an additional frictional-closure or hydrodynamic coupling.

A further possibility consists in using the electric machine as an overload coupling, i.e., the function of the overload protection is also accomplished by the electric machine. Furthermore, the electric machine acting as a coupling can be used to dampen vibration. The coupling can be adjusted such that it takes up peak torques and thereby achieves a reduction of rotational nonuniformity.

Basically, the electric machine is dimensioned such that it can directly start the drive assembly (i.e., by merging in from standstill). For this, relatively large torques needs to be produced. As an alternative for the case of smaller torque production, the electric machine can serve as a flywheel starter with electromagnetically coupled flywheel. This allows a starting even in cases when the electric machine cannot provide the necessary torque for a direct starting. The flywheel is preferably a part of the electric machine itself, e.g., its active unit at the takeoff end, along with the torque transmitter coupled to it. With gear disengaged, this can run up to high speed as an electric motor, thrusting against the inertial mass of the drive shaft and the compression of the internal combustion engine. By electromagnetic coupling with the electric machine itself, the flywheel is quickly braked and thus the drive shaft is accelerated such that it starts the engine. The advantage over familiar flywheel starters with mechanical coupling of the flywheel (for example, see the book by D. Henneberger "Electrical Engine Equipment," Braunschweig 1990, pp. 98–103) is the avoidance of wear on the coupling and a precisely controllable coupling process.

When there is talk hereafter of "the electric machine," for simplicity of language in the case of the dual machine this shall also include "one of the electrical machines" or "the electrical machines."

Advantageously, the electric machine is a rotary-field or traveling-wave machine. By "rotary-field machine"—in contrast with a commutator machine—is meant a machine in which a rotary magnetic field occurs (relative to the possibly rotating stator). This can be, for example, an induction or synchronous machine, especially for three-phase current, or a machine with electronic commutation. In a rotary-field machine, the magnetic field sweeps through a complete 360° revolution, while in a traveling-wave machine it only sweeps through one or more segments.

The drive system advantageously has at least one inverter at least one inverter for generating the voltages and/or currents of variable frequency, amplitude and/or phase required for the magnetic fields of the electric machine. The inverter can generate the voltages and/or currents needed for the magnetic fields (in particular, rotary or traveling fields) with any desired (within certain limits) frequency, amplitude or phase, or any desired combination of these quantities. It can do this advantageously by means of electronic switch from a predetermined dc or alternating voltage or a predetermined direct or alternating current. To special advantage, all three quantities—frequency, amplitude and phase—are freely selectable. An inverter generally has the advantage of being able to operate the electric machine with high variability under the most diverse operating conditions, possibly also—as shall be explained more closely hereafter—in a mode with rapidly alternating torque, possibly with superimposed additional torque.

Advantageously, during or staggered in time from its coupling and/or synchronization function, the electric machine performs the function of an active reduction of rotational nonuniformities. During the electromagnetic coupling function with the stator not restrained, this is accomplished by a clutch slip varying with the rotational nonuniformities. As a result, the electromagnetic coupling no longer allows rotational nonuniformities to get into the drive train, thus, it acts as vibration isolation. With the stator restrained, the reduction of rotational nonuniformities occurs—as already mentioned above—by applying torques, in particular, opposite in phase. Proposals for devices for active reduction of rotational nonuniformities are disclosed by Patent Abstracts of Japan, Vol. 11, No. 28 (M-557), Jan. 27, 1987 & JP-A-61 200 333, Patent Abstracts of Japan, Vol. 4, No. 29 (M-002), Mar. 14, 1980 & JP-A-55 005 454, EP-B-0 427 568, DE-A-32 30 607, EP-B-0 175 952, Patent Abstracts of Japan, Vol. 7, No. 240 (M-251), Oct. 25, 1983 & JP-A-58 126 434 and DE-A-41 00 937.

In particular, rotational nonuniformity can be such as occurs in an internal combustion engine, particularly a piston engine with internal combustion, through the gas and mass forces of the individual pistons acting on the drive shaft (i.e., especially the crankshaft). For example, in a four-cylinder four-stroke engine, relatively large rotational nonuniformity occurs in the second order (i.e., twice the rotational frequency of the engine).

Basically, the electric machine can be controlled such that it counteracts either only rotational nonuniformities to speed up (so-called positive rotational nonuniformities) or to slow down (so-called negative rotational nonuniformities). Especially effective, however, is a mode of operation in which it counteracts both negative and positive rotational nonuniformities, preferably by generating a rapidly varying torque (co-called variable torque), especially an alternating torque. For example, this can be a clutch slip-increasing or braking torque for a positive rotational nonuniformity and a clutch slip-reducing (possibly to negative clutch slip values) or driving torque for a negative rotational nonuniformity.

Advantageously, the rapidly varying alternating torques can be superimposed on the constant or slowly varying torques (so-called constant torques), which are generated in order to achieve the coupling and/or the synchronizing function, as well as possibly other functions with driving or braking action. In particular, the superpositioning is additive.

By "rapid variation" is meant a variation in the frequency range of the rotational nonuniformity being reduced, i.e., for the second-order rotational nonuniformity at a rotary speed of 3000 rpm, a variation with a frequency of 100 Hz. Relative to this, the constant torque generally varies more slowly.

When operating with clutch slip, excess energy accrues, which is primarily converted into lost heat in a conventional mechanical or hydrodynamic coupling. The electric machine according to the invention is preferably not a machine of the eddy current brake type, in which likewise only lost heat would be generated, but rather a machine which works like a generator, transforming the excess energy into electrical energy. This can advantageously be saved up and reused. Only if the storage capacity is insufficient (say, during extreme vehicle acceleration with slipping clutch) does the excess energy have to be converted into heat. The energy arising during other brake functions can also advantageously be accumulated at least in part. Such brake functions can serve, for example, for the electric machine to exert a braking synchronization function, to act as a generator for power supply, and/or (when the stator is stationary) to produce a braking of the vehicle and/or to reduce the slip of a drive wheel in the context of an antislip control system by braking. The machine can carry out an additional braking function in the context of the rapidly varying torque for reduction of rotational nonuniformity. The brake energy obtained when using these brake functions as a generator can be saved up (e.g., in an electrical accumulator or in a flywheel accumulator) and further used as drive energy for the electric machine or furnished to a network or the vehicle's battery, for example. A driving torque can serve as an accelerating synchronization function, for example, or (when the stator is stationary) it can support the drive assembly during an acceleration of the vehicle, for example, in order to fill up acceleration gaps, as in a turbocharged engine, or it can serve to reduce rotational nonuniformity in the context of the rapidly varying torque. This recuperation of brake energy serves to achieve the highest possible overall efficiency of the drive system.

The turning of energy into heat can advantageously take place through an electrical resistance, which can itself be air-cooled, or can surrender its heat to an existing cooling system of a vehicle, e.g., the cooling circuit of an internal combustion engine. The accumulation of the brake energy (constant torque and/or variable torque brake energy) can be accomplished, in particular, through an electrical accumulator and/or a mechanical accumulator (flywheel accumulator): the electrical accumulator, for example, can be a capacitor, an inductor, or a (fast) battery Advantageously, the inverter (if present) is an intermediate-circuit inverter, whose intermediate circuit has at least one electrical accumulator for brake energy or can be coupled to at least one such. The accumulator can serve either exclusively for the accumulation of brake energy (in this case, it would be switched in addition to a normally present intermediate-circuit accumulator, which can furnish the voltage or current pulses needed during the inverter's clock operation), or it can only partly serve to accumulate the brake energy, i.e., also accumulate other energy—e.g., that necessary for the clock operation (in the latter case, it might coincide with the customary intermediate-circuit accumulator). In any case, it can be advantageous to configure the rectifier as an intermediate-circuit rectifier—even without intermediate storage of brake energy, for example.

By an "intermediate circuit" is meant a circuit which can supply essentially dc voltage or direct current, from which an inverter component (the so-called machine inverter) can form variable alternating voltage or current by pulse or cycle operation. This dc voltage or direct current must provide voltage or current pulses with extreme edge steepness and at high voltage or current level. Generally speaking, an intermediate inverter comprises three subassemblies, namely, an input subassembly for supplying or taking away electrical energy, an output subassembly in the form of the machine inverter, and the intermediate circuit which comes between these.

In a flywheel accumulator, the flywheel can advantageously be electrically coupled to the system by an (additional) electric machine. This can be, for example, a rotary-field or commutator machine controlled by its own rectifier. The first electric machine and the flywheel machine work in opposite cycle: when the former is braking, the latter is accelerating the flywheel, and when the former is driving, the latter is braking the flywheel. Since relatively high energy densities can be built up with such a flywheel energy accumulator, its use is especially advantageous when it is necessary to accumulate the initial coupling slip energy.

The electric machine for the coupling and/or synchronization function can—besides these functions and perhaps the active reduction of rotational nonuniformities—at the same time or staggered in time perform additional functions and thus replace traditionally present extra machines specializing in this. In particular, it can also have the function of a direct starter and/or a generator for power supply, e.g., for charging a battery or energizing an on-board network. A direct starter—unlike a flywheel starter—can start the drive assembly by merging in from standstill. The electric machine advantageously sits directly (i.e., no transmission) on the drive shaft of the drive assembly or a shaft coupled to it. Preferably, the electric machine acting as a direct starter is configured such that it provides driving action during the starting, at least basically until attaining the idling speed of the drive assembly (which generally lies between 600 and 800 rpm at the operating temperature). This measure lets the engine start under its own power only when reaching its idling speed, which lowers the fuel consumption, avoids the especially harmful emissions during starting, and makes the starting process more fast.

The electric machine can generate driving and/or braking torques for further additional functions. For example, this can serve to accelerate a vehicle together with the drive assembly. For braking a vehicle, the electric machine can serve as a wear-free, possibly generator-type brake or auxiliary brake. In connection with a drive slip control system, the electric machine can quickly diminish the overall driving moment and, thus, the slip of one or more drive wheels by braking. The drive wheel slip can be reduced as well by increasing the clutch slip (when the machine is acting as an electromagnetic coupling), instead of by braking. The brake energy obtained in this process can be stored up and reused.

For the operation of high-power consumers, such as auxiliary machines (air conditioners, servo-drives, pumps) and heating systems), it is advantageous for the electric machine to furnish current at relatively high voltage level, preferably in the upper range of the low voltage, where no special protection against electrocution is necessary (e.g., around 60 V dc voltage). If one goes beyond this, a range of 250–450 Volts is preferably chosen. Advantageously, the high-power consumers are electrically (instead of mechanically, as heretofore, or by using waste heat) operated (or heated) at these high voltage levels. Such high voltage levels can already be present in the intermediate circuit, especially in an intermediate-circuit inverter, and thus do not need to be specially generated for this additional purpose. For low-power consumers, a traditional low-voltage on-board network (12 V or 24 V) can be provided. The vehicle's battery can be situated in the range of the higher voltage level or that of the low-voltage on-board network.

The additional function of an active reduction of rotational nonuniformities which may be provided is based—as mentioned above—on the fact that the electric machine counteracts positive and/or negative rotational nonuniformities, i.e., by increasing the clutch slip or braking for positive rotational nonuniformities and/or by reducing the clutch slip or driving for negative ones. The control of the electric machine can occur through (feedback) closed-circuit control on the basis of a measurement of the instantaneous rotational nonuniformity or another quantity coupled to it, or through (nonfeedback) open-loop control on the basis of not the actual, but rather the anticipated rotational nonuniformity. As an example of an open-loop control, on a prototype of an internal combustion engine as a function of the (crank) shaft angle and one or more operating parameters (e.g., rotary speed and throttle valve position), one can read out from a characteristic diagram certain rotational nonuniformities in dependence on the actual crankshaft angle at present and the other operating parameters and actuate the electric machine accordingly, in order to counteract the anticipated rotational nonuniformity. Hybrid forms are also possible, e.g., an adaptive open-loop control, i.e., an open-loop control with feedback, in which however (unlike a feedback closed-loop control) the measured information does not act instantaneously, but only during later rotational nonuniformities.

The measurement of rotational nonuniformities can be direct, e.g., based on a measurement of the angle position or angular velocity as a function of time, or indirect, e.g., by measuring the gas pressure in one or more engine cylinders and/or the instantaneous torque of the engine, e.g., measured by means of a torque hub (in which case the mass forces should be taken into account as an additional, basically unchanging source).

The electric rotary-field machine or traveling-wave machine of the drive system is preferably an induction machine, a synchronous machine, or a reluctance machine, especially for three-phase current. An induction machine generally has a relatively simple rotor (generally a rotor with short-circuit windings or windings whose ends go to slip rings). On the contrary, synchronous machines have rotos with pronounced magnetic poles, e.g., permanent magnets or electromagnets, which are supplied with current via slip rings, for example. Reluctance machines belong to the synchronous machines in the broad sense. In particular, induction machine is preferably bas in the case of the induction machine is preferably based on a field-oriented automatic control (so-called vector control). Starting with directly measurable momentary quantities, such as the imposed voltage, stator current, and perhaps rotary speed, using a computerized dynamic machine model, the stator current is broken down into a torque-forming component, which generates the torque with the rotor flux, and a component perpendicular to this, generating the machine flux, and in this way the torque is determined by computer.

The electric machine along with its entire control unit is an auxiliary system, which is arranged, e.g., in the drive train of a motor vehicle in place of or in addition to the traditional coupling. Because of its auxiliary nature, it should take up little space relative to the drive assembly, and therefore should be as compact as possible. The advantageous measures mentioned hereafter serve such a compact construction—besides other advantageous purposes.

One step for achieving good compactness is for the electric machine to have a fine pole division, in particular, at least one pole per 45° angle of the stator. In a full-circle (360°) machine, this corresponds to a total of at least 8 poles. Even smaller polar divisions are especially advantageous, corresponding to 10, 12, 14, 16 or more poles in the closed-circle machine. A fine polar division allows the stator winding heads to be small, both in the axial and the peripheral direction of the machine, so that the machine can be shorter overall in the axial direction. Also, with a finer pole division, the stator back for the return magnetic flux can be thinner (and, thus, also lighter), with the result that the rotor can have a larger diameter for the same outer diameter of the machine. A larger rotor diameter leads to a larger torque, on account of the longer air gap in the peripheral direction and the larger active lever arm. Thus, on the whole, a finer pole division leads to a lighter and more compact machine. In addition, the resistive losses are less on account of the shorter length of the winding wires—smaller winding heads require less nonactive winding wire. Since, moreover, the stray field (which essentially determines the reactive power component) depends on the winding head surface, it is relatively slight for a fine pole division. A slight stray field is especially advantageous for reducing the rotational nonuniformity, because in this case—unlike a conventional electric machine—there is an ongoing alternation between engine and generator operation and reactive power must be continuously consumed with the corresponding pole reversal.

Fine pole divisions are not customary for high-speed rotary-field machines, since they result in a relatively high frequency of pole reversals. A customary value for the pole reversal frequency is 120 Hz, for example. The electric machine used in the context of the invention, on the other hand, preferably has a high maximum pole reversal frequency, preferably between 300 and 1600 Hz or more, especially preferably between 400 Hz and 1500 Hz.

In order to lessen the influence of eddy currents in the stator—which grow with increasing pole alternation frequency—the stator advantageously has thin stator plates, preferably with a thickness of 0.35 mm or less, especially preferably 0.25 mm or less. As a further measure for diminishing the losses, the stator plates are preferably made from a material with low remagnetization losses, especially less than 1 W/kg at 50 Hz and 1 Tesla.

As a further measure contributing to a compact construction, the electric machine preferably has an inner fluid cooling with a cooling fluid such as oil. A very effective cooling technique consists in flooding the machine entirely with cooling fluid in the interior. However, a disadvantage of this is that turbulence losses occur above around 500 rpm, and these can take on noticeable extent above roughly 2000 rpm. In order to counteract this, the supply of cooling fluid is preferably dependent on the loss power and/or rotary speed, and the fluid cooling is preferably a spray fluid cooling. There is then always only as much cooling fluid in the machine as is required at the time to carry away the loss power.

Quantitatively, the compactness can be expressed in terms of the "torque density." Preferably, the electric machine has a high torque density—as compared to the maximum torque—which is especially preferably greater than 0.01 Nm/cm$^3$.

Radial vibrations can also often occur on a drive shaft. In order to be robust to such vibrations, the system is preferably designed such that the electric machine works far into the region of magnetic saturation. A measurement of the magnetic saturation is the current coverage (at maximum torque) in the stator per centimeter length of the air gap in the peripheral direction. Preferably, this measure amounts to at least 400–1000 A/cm, especially preferably at least 500 A/cm. Operation far into the saturation range makes it possible to design the machine with relatively broad air gap. Changes in the air gap—such as occur during radial vibrations—have little effect, due to the operation in the saturation range.

Such a compact-construction electric machine generally has relatively low inductance. Yet in order to achieve by means of a synchronized voltage the most precise sinusoidal current to generate the electrical rotary fields or traveling waves, the inverter preferably works at least sometimes with a higher cycle frequency, in particular, 10 kHz to 100 kHz or more. This provision is also advantageous for achieving a high temporal resolution for the system; for example, with a cycle frequency of 20 kHz, one can achieve a temporal resolution in the torque behavior of the electric machine of 2 kHz, with which one can effectively reduce a rotational nonuniformity at 200 Hz (200 Hz corresponds, for example, to the fourth order at 3000 rpm). A high cycle frequency, moreover, also has the advantage of enabling a compact construction for the inverter itself since, for example, intermediate-circuit capacitors of lower capacitance can be chosen.

As a further advantageous provision for achieving a compact construction of the inverter, electronic switches of the inverter are fluid-cooled, preferably boiling bath cooled. As the boiling bath coolant, one can use a fluorohydrocarbon, for example. In boiling bath cooling, the coolant evaporates at hot spots and in this way obtains its relatively high heat of evaporation from them. The vapor rises and can condense, for example, in an external cooler, thereby surrendering its heat of evaporation. This cooling technique enables the most compact arrangement of the electronic switches of the inverter without any cooling body, while relatively slight temperature differences (e.g., 2–10° C.) are enough to achieve even high cooling performance. Another advantageous cooling technique consists in connecting several electronic switches of the inverter, especially 2–20 or more, in parallel. The parallel circuit yields a distributed arrangement of heat sources and, thus, a relatively low loss power density.

The inverter preferably contains semiconductor elements as switches, preferably fast semiconductor switches, such as field effect transistors—especially preferably metal oxide semiconductor (MOS) field effect transistors, bipolar transistors, and/or bipolar transistors with insulated gate connection (IGBTs). By "fast" semiconductor switches are meant, in particular, ones which allow maximum clock frequencies of 10–100 kHz or more. The inverter is advantageously a pulse inverter, i.e., it generates the voltages and/or currents necessary for the magnetic fields of the electric machine through pulses, especially on the basis of pulse width or pulse amplitude modulation, [which?] because of the machine's inductance are transformed into nearly sinusoidal currents of any given adjustable frequency, amplitude, and/or phase.

For optimal utilization of the available space in a motor vehicle, for example, it is advantageous to integrate a mechanical coupling, e.g., a force-closing bridge coupling or a friction-closing starting coupling, into the electric machine, especially into its rotor. For example, in an induction and synchronous machine with interior rotor, the rotor can be nonfunctional in its inner region and thus have a hollow construction to accommodate the coupling. In this way, it is possible for the electric machine plus integrated mechanical coupling to take up only as much space in the axial direction, or just a little more, as the starting coupling itself requires in a conventional motor vehicle. In the case of an integrated starting coupling, because of the reduced available diameter, and to minimize the moment of inertia, a multidisk and/or multiplate coupling design is preferable. If the integrated coupling is a wet coupling, the coupling fluid can also provide for the cooling of the electric machine. Activation of the coupling can be mechanical, electrical, magnetic, electromagnetic, hydraulic, pneumatic, or a mixture of these.

In order to identify the instantaneous absolute or relative angular position of the shaft or shafts at any time in the system, the electric machine or the shaft is advantageously outfitted with one or more rotor position or shaft position pickups. To obtain the most precise angle position information possible, a rotation transformer (so-called "resolver") can be used in particular, i.e., a transformer with translation ratio dependent on angle. High-resolution encoders can also be used for this purpose, e.g., a combination of a high-resolution incremental pickup and a simple absolute pickup.

In one advantageous embodiment, the electric machine also serves for a drive slip regulation. Namely, it is designed such that it can produce a lessening of drive slip by reducing the drive moment (of the drive assembly), in particular, by brake action and/or—when the electric machine is working as a coupling—by clutch slip action.

The drive slip reduction generally becomes active only when a particular condition, say, the exceeding of a limit value of drive slip or a limit value of the time change in the drive slip or a combination of such conditions, is fulfilled.

The invention is also addressed to a method of operating a drive system, especially for a motor vehicle, wherein the drive system has a drive assembly, in particular, an internal combustion engine, wherein a coupling into the drive train of the drive system and/or an active transmission synchronization is carried out with at least one electric machine.

The method can be implemented advantageously with a drive system according to one or more of the above-explained configurations. As for individual features and advantages of the method, refer to the above explanations on the system, which also apply fully to the method in its different configurations.

The invention can also be advantageous in a drive system in which the electric machine acts neither as an electromagnetic coupling nor as a synchronization device.

Furthermore, in all of the present specification, numerical indications "x" shall be understood in the sense of "at least x," and only preferably in the sense of "exactly x."

Figure 2:
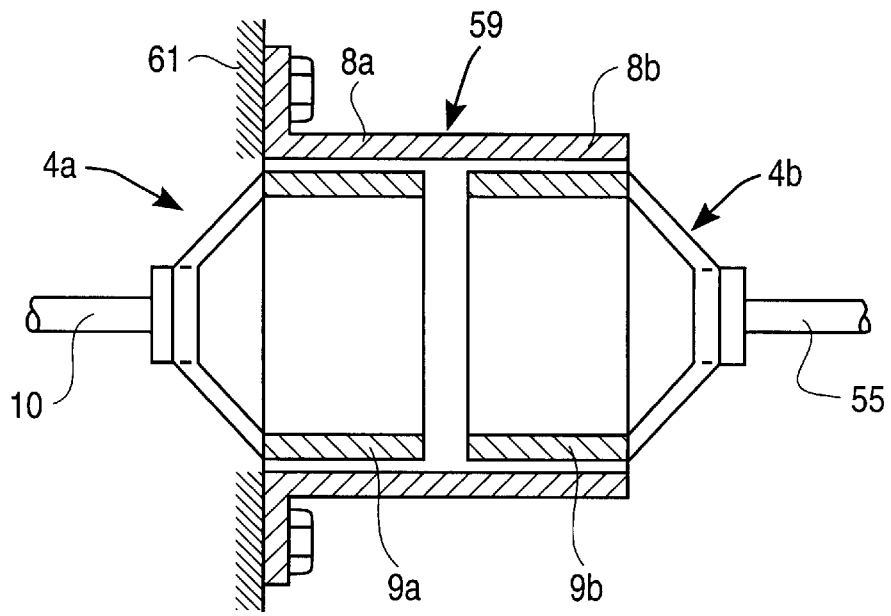
Figure 3:
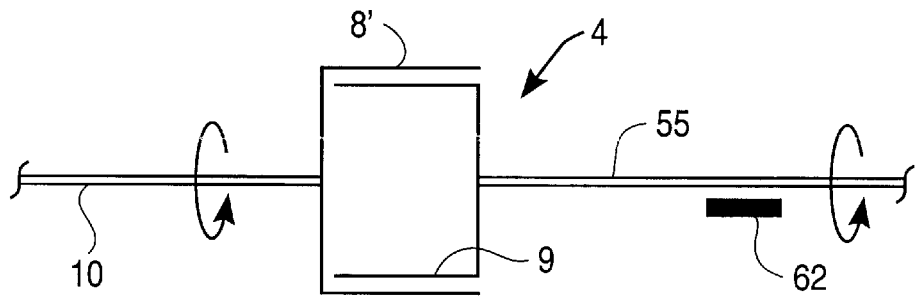
Figure 4:
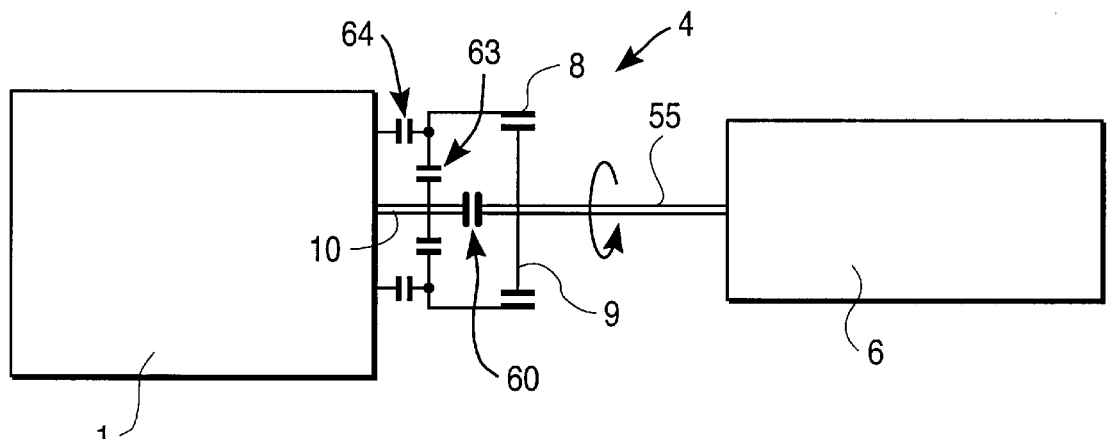
Figure 5:
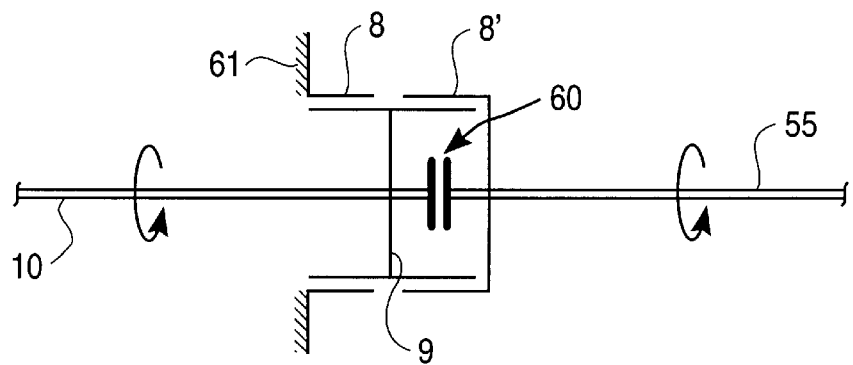
Figure 7:
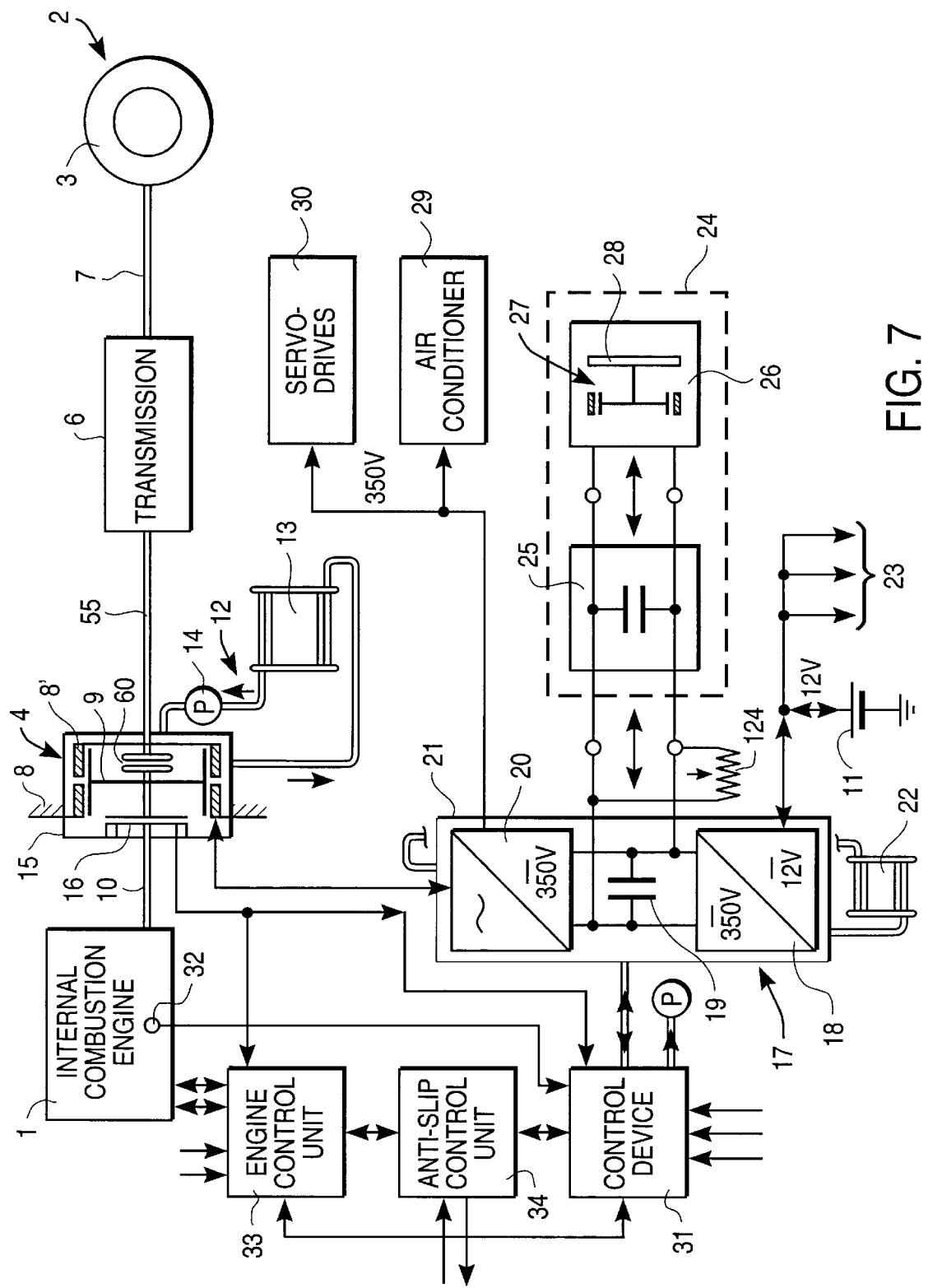
Figure 8:
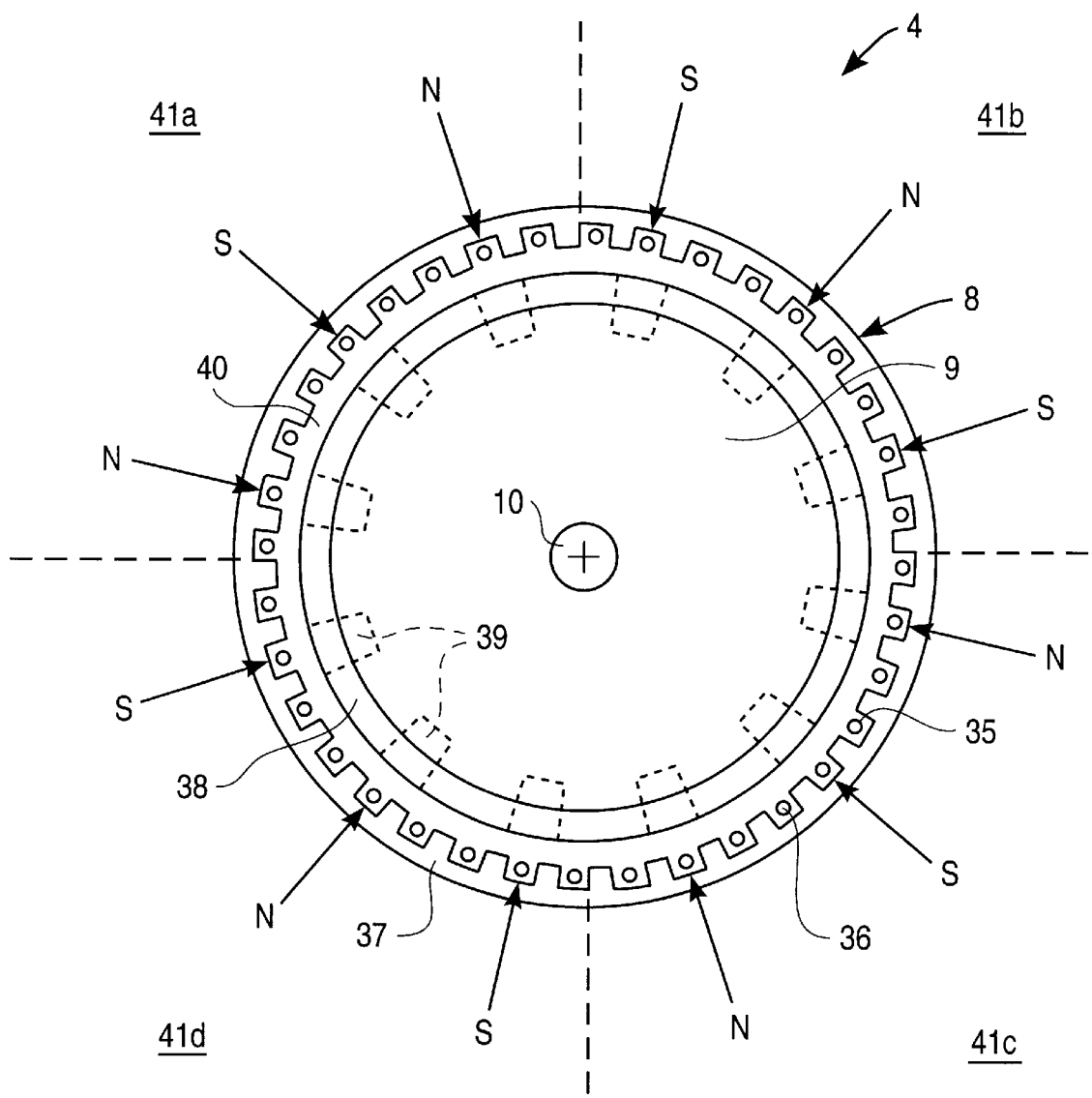
Figure 9:
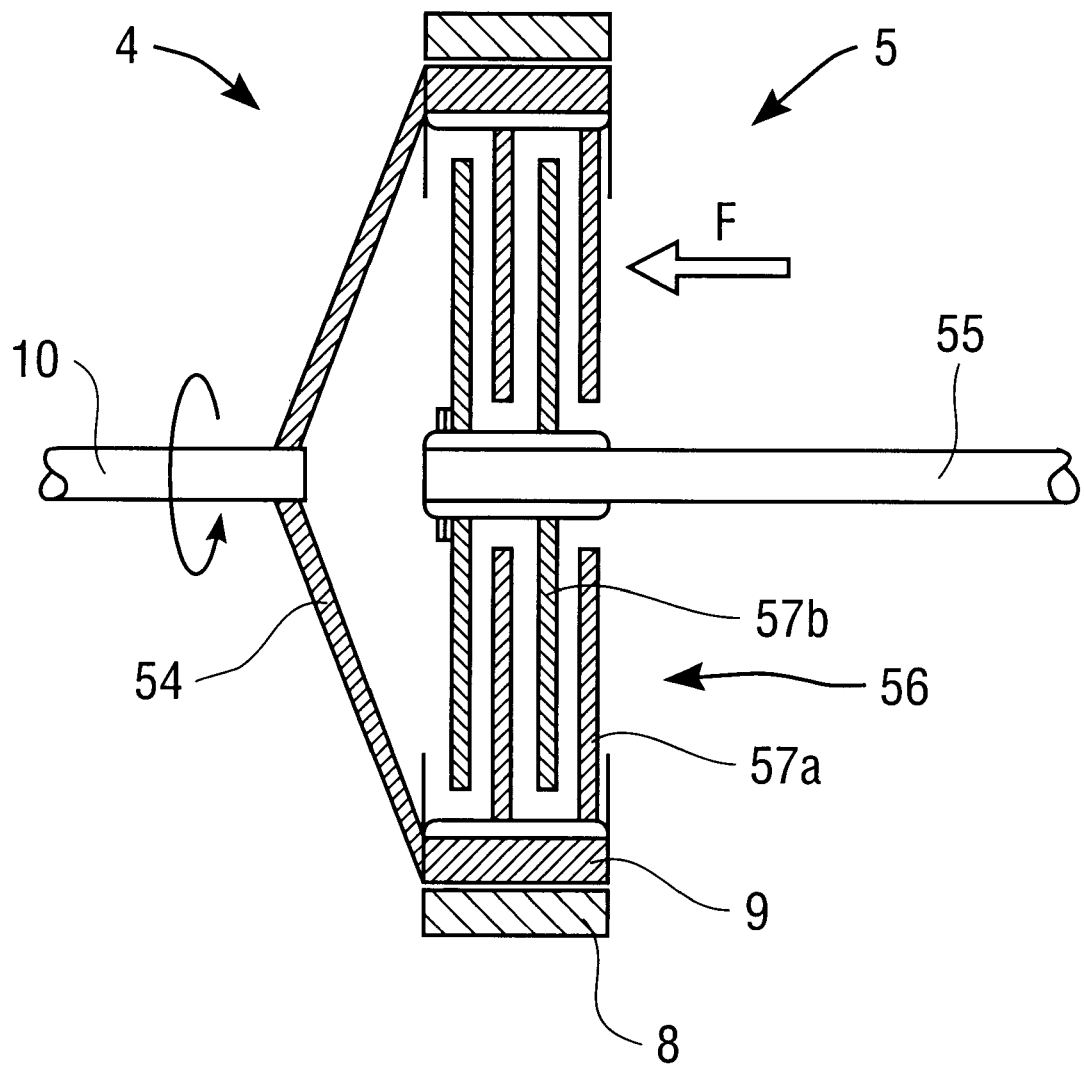
Figure 10:
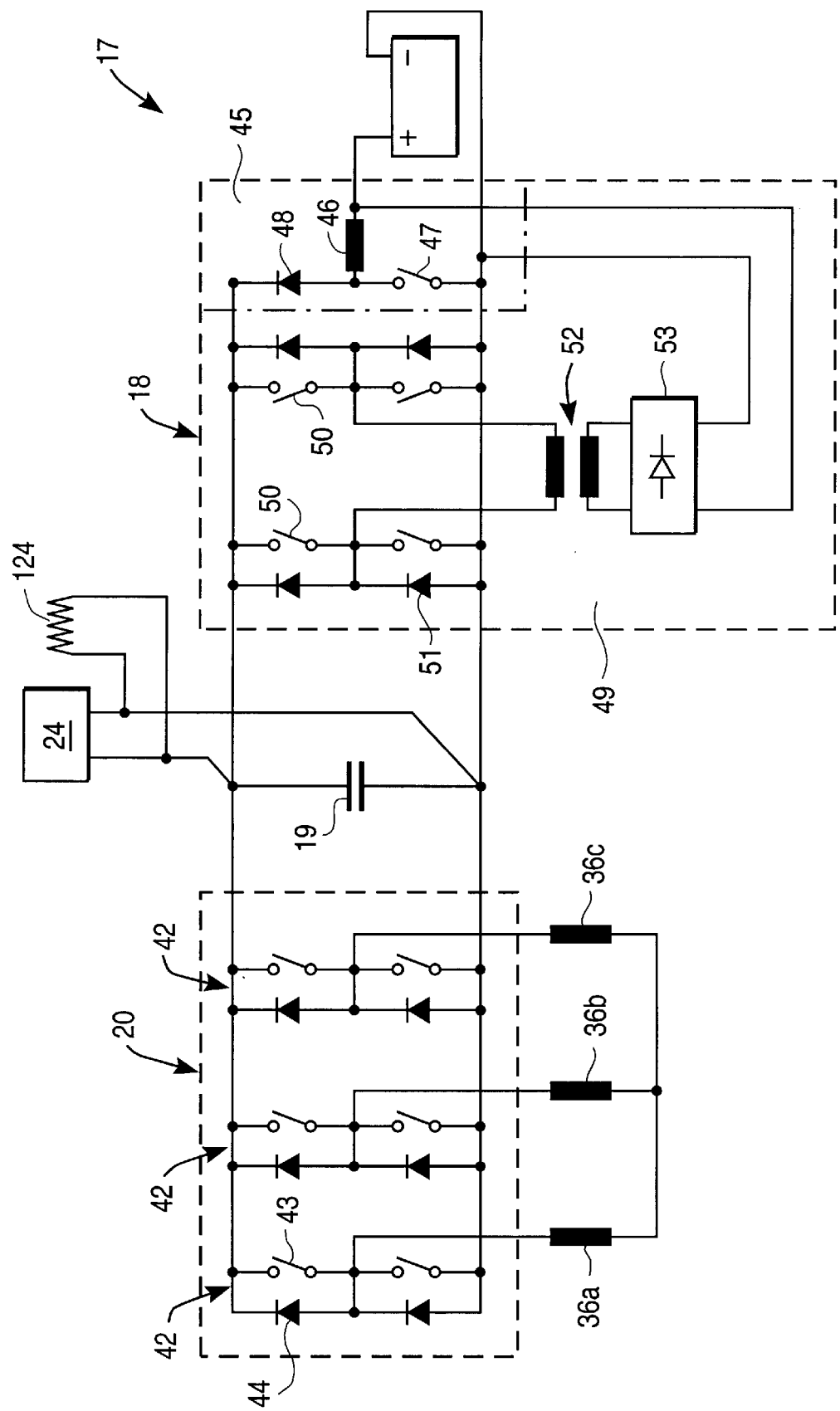

The invention shall now be explained more closely by means of sample embodiments and the enclosed schematic drawing. The drawing shows:

FIG. 1 a schematic representation of a dual electric machine;

FIG. 2 a representation of a dual machine per FIG. 1 with joint stator body;

FIG. 3 a schematic representation of an electric machine with electromagnetic operating units that can rotate;

FIG. 4 a schematic representation of another electric machine with electromagnetic operating units that can rotate;

FIG. 5 a schematic representation of another electric machine with electromagnetic operating units that can turn relatively and a stationary operating unit;

FIG. 6 a schematic sample representation of the functioning of the system for active reduction of rotational nonuniformities;

FIG. 7 a not-to-scale schematic representation of one embodiment of the drive system;

FIG. 8 a schematic cross sectional representation of an electric machine with plane of sectioning perpendicular to the axial direction in order to illustrate various machine types which can be used in the system;

FIG. 9 a schematic cross sectional representation of an electric machine with integrated frictional coupling with plane of sectioning in the axial direction;

FIG. 10 a schematic circuit diagram of an inverter used in the system.

In the figures, parts essentially identical in function bear the same references.

A dual electric machine 4, per FIG. 1, which has the function of an electromagnetic coupling and/or a synchronizing device, sits in a drive train 2 between a drive shaft, e.g., the drive shaft 10 of an internal combustion engine 1 (or a shaft coupled to it), and a takeoff shaft, e.g., a transmission shaft 55 coupled to a transmission 6. It comprises two electric machines 4a, 4b, each with a nonrotating stator 8a, 8b and each with a rotor 9a, 9b, rotating with the drive shaft and takeoff shaft, respectively. The rotors 9a, 9b—and, thus, the drive shaft and takeoff shaft—can be firmly mechanically joined together—by means of a mechanical bridge coupling 60—here, a positive-locking or friction-locking coupling. Preferably, this can be actuated in controlled manner, e.g., mechanically, electrically, hydraulically or pneumatically. In other embodiments, the bridge coupling 60 is not present.

FIG. 2 shows a dual machine 4 corresponding to FIG. 1, in which the rotors 9a, 9b are arranged in a common stator body 59 in coaxial manner, which accommodates the two (electrically separated or separable) stators 8a, 8b and is firmly secured, e.g., to a crankcase 61 of the engine 1. The bridge coupling (not shown here) can be implemented, for example, in that the rotors 9a, 9b can be brought into positive or friction locking with each other by axial shifting. As an alternative, it can be formed, e.g., by a friction or claw coupling, integrated in the rotors 9a, 9b.

The dual machine 4 of FIGS. 1 and 2, besides its function as an electromagnetic coupling, has the functions of an active transmission synchronization device, an active reducer of rotational nonuniformity, a direct starter for the engine, a generator for supplying consumers with electricity, and a booster to support the engine 1 during acceleration of, say, a motor vehicle, as well as a generator type brake for supporting the vehicle's braking. The electric machine 4 also works to reduce drive wheel slip in the context of an antislip control—by regulating the clutch slip in the electric machine.

The coupling function in one embodiment is the function of a starting and shifting clutch, while in another embodiment it is only the function of a clutch for shifting gears. In the first embodiment, the mechanical or hydrodynamic clutch usually present in the drive train of a motor vehicle can be eliminated. In the second embodiment, on the other hand, it is present as a starting clutch, in addition to the electromagnetic coupling 4. This is arranged, for example, later on in the takeoff shaft 55 and can remain closed after the starting—i.e., even during gear shifting.

In both embodiments, the bridge coupling 60 is closed upon synchronization of the shafts 10, 55, in order to eliminate the electromagnetic coupling losses, and also to transmit the high starting moment in the second embodiment, and also to provide greater torques by coupled parallel running of both machines 4a, 4b in other functions, such as reduction of rotational nonuniformity and starting. Since the bridge coupling 60 is only coupled in when the shafts are synchronized, it is advantageously configured as a positive-locking clutch (e.g., hook coupling).

In a third embodiment, the dual electric machine 4 has no coupling function, but serves (as in the first and second embodiments) for active transmission synchronization by accelerating or braking the takeoff shaft 55 in the period of time between shaft separation and connection, which is accomplished by a bridge coupling 60 which is configured as a mechanical or hydrodynamic starting and shifting clutch, e.g., in the form of a friction-locking clutch.

The electrical actuation of the machines 4a, 4b occurs independently of each other in the embodiments with coupling function, here, by two essentially independent inverters, in order to allow generation of opposite torques (e.g., when the machine 4a at the drive end is working as a generator and that 4b at the takeoff end as a motor) and/or torques at different rotary speeds (e.g., during the starting and after gear shifting). In the embodiment without electromagnetic coupling function, no independent actuation is required. Here, an inverter will suffice, which is suitable to control the different functions (synchronization, reduction of rotational nonuniformity, starting, production of current, acceleration, braking) and can be coupled optionally to only one machine 4a or 4b or to both machines 4a, 4b. The optional coupling allows, first, having both machines 4a, 4b jointly (with bridge coupling 60 closed) generating torque for many functions—say, for starting—and, secondly, having only one of them (with bridge coupling 60 opened) generating torque for other functions—say, having the machine 4b at the takeoff end generating a braking torque for the synchronization or braking of the vehicle. Electrical energy which accrues during the generator type braking and clutch slip is saved up, e.g., [in] an electrical (e.g., capacitor), electrochemical (e.g., battery) or kinetomechanical accumulator (e.g., flywheel accumulator) and reused. If the accruing energy or power exceeds the capacity of the accumulator—which may be the case, e.g., in the starting clutch function, the excess energy is carried away in the form of heat by heating resistors.

A single electric machine 4 per FIG. 3, having the function of an electromagnetic coupling and/or synchronizing device, has an inner and an outer electromagnetic active element, which are termed here the rotor 9 and the stator 8', borrowing the conventional terminology from electric machines. The rotor 9 is firmly joined to the takeoff shaft 55 and the stator 8' is firmly joined to the drive shaft 10 (in other configurations—not shown—this arrangement is reversed). The electrical machine 4 can thus rotate as a whole in addition to the rotor's rotation, the term "stator" should thus be taken only in a transferred sense, seeing that it can rotate. Whereas in a stationary electrical machine—such as a rotary-field machine—it is possible to restrict the current supply to the stationary active element (i.e., the stator) and to produce currents in the rotating active element (i.e., the rotor) without supplying current, by induction alone, in the present case—where both active elements can rotate—current is supplied to at least one of them (here, the stator 8') across rotation-movable electrical connections (e.g., across wiper/slip ring contacts, not shown here). The takeoff shaft 55 can be prevented from turning with a mechanical clutch, here, a brake 62 which is thrust against the vehicle chassis or the transmission housing. The configuration shown has no bridge coupling, but other configurations (not shown) are outfitted with a frictional or nonpositive-locking bridge coupling for the mechanical connection of the shafts 10, 55. The machine 4 can be placed in or on the engine housing, transmission housing, or at any other place in the drive train 2.

The single electric machine 4—despite its simple construction—can essentially perform all functions of the dual machine per FIGS. 1 and 2, so that the remarks given there are also valid here—insofar as makes sense.

In the function as shifting coupling and possibly as starting coupling, a synchronism of the shafts 10, 55 is achieved by such an adjustment of the torque-generating magnetic fields of the machine 4 that a uniform rotary speed prevails between the shafts 10, 55, i.e., the coupling slip between stator 8' and rotor 9 precisely vanishes. In an induction machine, this is accomplished, for example, by automatic control or open-loop control of the magnetic slip of a rotary field of suitable frequency and amplitude, turning opposite the direction of the drive torque relative to the stator 8'. A positive-locking bridge coupling (not shown here) eliminates the electromagnetic losses during vanishing coupling slip.

The active transmission synchronization—which can be implemented in configurations of the single machine 4 even without coupling function—is accomplished here by thrusting against the drive shaft 10 turning at the variable speed of the internal combustion engine 1. The contribution of this rotation is taken into account when determining and controlling the relative speed of the machine 4 necessary to the particular synchronization.

A reduction of rotational nonuniformities of the drive shaft 10 can occur with the vehicle at standstill, thrusting against the rotor 9 which is then prevented from turning by means of the brake 62. When moving under power, rotational nonuniformities of the drive shaft 10 can be isolated from the takeoff shaft 55 with the bridge coupling not engaged (or not present), specifically, by reducing [this torque] (i.e., increasing the clutch slip) for positive rotational nonuniformity and increasing [this torque] (i.e., decreasing the clutch slip) for negative nonuniformity.

Additional acceleration or braking is possible with the bridge clutch not engaged by generating appropriate torques—or in other words—less or more clutch slip. The electric machine 4 can be involved in an ASR control such that when the drive wheel slip is too large the clutch slip is momentarily increased and thus the moment applied to the drive wheels is reduced. A generator function to produce current is achieved by permanently maintaining clutch slip.

The electric machine 4 can start the internal combustion engine 1 directly, by thrusting against the takeoff shaft 55 fixed by the brake 62. In another configuration, when the machine 4 does not provide sufficient torque for this, it can serve as a nonwearing flywheel starter, making use of the electromagnetic coupling function. For this, the electric machine 4 first accelerates, with gear disengaged and brake 62 released, the then free-wheeling rotor 9, along with the takeoff shaft 55, propped against the drive shaft 10 and the compression of the still idle engine 1, up to a relatively high rotational speed, e.g., 2000 rpm. The electric machine 4 is then reversed in a brief time, such that it produces a braking moment, i.e., frictional connection between the rotor 9 and the stator 8'. In this way, the rotor 9 with the takeoff shaft 55 and the stator 8' with the drive shaft 10 are quickly brought to a common mean speed (e.g., 800 rpm) and the engine 1 is started.

FIG. 4 shows a further modification of the electric machine with rotating active units per FIG. 3. The remarks made there and in connection with FIGS. 1 and 2 are also valid here—as far as makes sense. The machine 4 per FIG. 4, with somewhat greater expense, has the advantage of enabling, even in the driving state of the drive system, a reduction of rotational nonuniformities at their origin—i.e., at the drive shaft 10, and not only at the takeoff shaft 55, and also providing the generator function with bridge coupling closed—and, thus, at higher efficiency, as well as enabling the synchronization with respect to a stationary reference element—not one rotating at variable speed—which simplifies its control.

This is accomplished in that the stator 8' is no longer permanently coupled to the drive shaft 10, but rather can adopt three different coupling states in controllable manner:

1. coupled to the drive shaft 10 (as in FIG. 3);
2. freely rotatable without coupling to the drive shaft 10;
3. secured against rotation.

Two additional mechanical couplings, which can be friction-locking, but preferably also positive-locking couplings, are used for this: an engine coupling 63, which in the closed state couples the stator 8' to the drive shaft 10 (coupling condition 1), and a stop coupling 64, which in the closed state stops it from turning, e.g., by coupling to the crankcase 61 (coupling condition 3). For coupling condition 2, both of them are opened; a simultaneous closing is a forbidden state. The couplings 63, 64 (which are drawn double in FIG. 4 only for reasons of rotational symmetry), as well as the bridge coupling 60, can be activated in controlled manner, e.g., mechanically, electrically, hydraulically or pneumatically.

The control of the electric machine 4 and the couplings 60, 62, 63 occurs through the different operating states and functions of the drive system according to the following process sequences:

1. Starting of the internal combustion engine 1 (flywheel start):
   i. Release gear (e.g., by the driver);
   ii. Engine coupling 63 is closed;
   iii. Rotor 9 is accelerated to high speed by electric machine 4;
   iv. Braking torque is engaged in electric machine 4 by braking rotor 9 and accelerating stator 8', so that the engine 1 turns over:
2. Starting of the vehicle:
   i. Bridge coupling 60 is opened;
   ii. Rotor 9 is brought to a halt by electric machine 4;
   iii. First gear engaged (e.g., by driver);
   iv. Rotor 9 is electromagnetically accelerated with nominal starting torque, i.e., carried along by stator 8';
   v. When synchronized, bridge coupling 60 is closed;
3. Stationary driving operation with reduction of rotational nonuniformity:
   i. Engine coupling 63 is opened, so that the stator 8' turns freely;
   ii. Stator 8' is brought to a halt by electric machine 4;
   iii. Stop coupling 64 is closed, so that a rigid connection prevails between stator 8' and the crankcase of the engine 1;
   iv. Alternating torque is generated by the electric machine 4 to reduce rotational nonuniformities of the drive shaft 10;
4. Shifting:
   i. Engine drive torque is removed (if necessary, with support from the electric machine) (e.g., by driver);
   ii. Bridge coupling 60 is opened;
   iii. Gear is disengaged (e.g., by driver);
   iv. Rotor 9 is accelerated or braked to that new speed which fulfills the synchronization condition for the new gear to be engaged;
   v. This gear is engaged (e.g., by the driver);
   vi. Bridge coupling 60 is closed;
   vii. Engine drive torque is again applied (e.g., by driver).

A reduction of rotational nonuniformity is also possible in idling, as shown by the following process sequence, which can continue after the above step 1:

5. Idling with reduction of rotational nonuniformity:
   i. Engine coupling 63 is opened, so that the stator 8' turns freely;

ii. Stator 8' is brought to a halt by electric machine 4;

iii. Stop coupling 64 is closed, so that a rigid connection prevails between stator 8' and the crankcase of the engine 1;

iv. Alternating torque is generated by the electric machine 4 to reduce rotational nonuniformities of the drive shaft 10.

The closing of the couplings 60, 63, 64 occurs only at vanishing relative speed each time. The generator function and additional braking or driving torques are implemented— like the synchronization function and the reduction of rotational nonuniformity—with closed bridge coupling 60 and closed stop coupling 64 by appropriate braking or driving torques of the electric machine 4.

Other embodiments start the engine 1 directly, namely, with bridge coupling 60 closed and stop coupling 64 closed.

The electric machine 4 per FIG. 5 largely corresponds functionally to that shown in FIG. 4, so that the remarks on FIG. 4, as well as 1–3, are also valid here—except as regards the departures mentioned hereafter. A major difference from the machine of FIG. 4 consists in that the switching from "rotating rotor" to "stationary rotor" does not occur mechanically, by opening and closing of couplings, but rather electrically. A further difference consists in that the roles of the drive shaft 10 and the takeoff shaft 55 of the machine 4 shown in FIG. 4 are reversed, which leads to minor departures in the mode of functioning—explained more closely below. In embodiments (not shown), however, the roles of the drive shaft 10 and the takeoff shaft 55 correspond to those of FIG. 4; these embodiments do not show these departures.

In the electric machine 4 shown, the (exterior) stator 8' and the (interior) rotor 9—as mentioned—are firmly joined to the takeoff shaft 55 and the drive shaft 10, respectively, and cannot be decoupled. In addition to the rotary stator 8', the machine 4 is outfitted with a stator 8 prevented from turning, which thrusts against the crankcase 61 (for example). This is immediately adjacent to the rotary stator 8', being displaced in the axial direction (for example) toward the engine 1. It is arranged coaxially to the rotary stator 8' and has the same internal diameter. The windings of the two stators 8', 8 are self-standing, so that they are decoupled or can be decoupled in their generation of magnetic field. The rotor 9 is broad enough that it extends in axial direction over substantially the active surfaces of both stators 8', 8. A bridge coupling 60—as in FIG. 4—couples the drive shaft 10 to the takeoff shaft 50. In other embodiments (not shown), the rotor 9 is on the outside and the stators 8', 8 on the inside.

The shifting between the stationary stator 8 and the rotary stator 8' occurs by means of a switchable power supply unit, here, a suitably switchable inverter. This supplies either the stationary stator 8 for the functions of direct starting, reduction of rotational nonuniformity, vehicle braking and acceleration, and the generator functions, or the rotary stator 8' for the functions of electromagnetic coupling, synchronization, and flywheel starting with the respective currents and voltages required each time, being able to switch inertia-free and without noticeable time delay between them.

Unlike FIG. 4, the function "synchronization" is controlled by generating torque between the rotary stator 8' and the rotor 9, which requires more control engineering because of the thrusting against the variable-speed drive shaft 10. This is because, in the machine 4 of FIG. 5, the bridge coupling 60 viewing in the takeoff direction lies behind the electric machine formed from the stationary stator 8 and the rotor 9, whereas in the machine 4 of FIG. 4, it lies in front of the electric machine with stationary stator. In the embodiment (not shown) in which the roles of the drive shaft 10 and the takeoff shaft 55 are reversed compared to FIG. 5, this functional difference from FIG. 4 does not exist.

In other embodiments, the two stators 8, 8' are simultaneously and independently fed by two independent power supply devices, here, and inverters. This enables an execution of the functions assigned to the stationary stator 8, e.g., the generator function and the reduction of rotational nonuniformity, even during the execution of the functions assigned to the rotating stator 8', e.g., the electromagnetic coupling function.

Another embodiment (not shown) of the electric machine with one rotor, one permanently stationary stator, and one mechanical coupling between the drive assembly and the electric machine, allows an active transmission synchronization, but provides no electromagnetic coupling function.

Figure 6A:
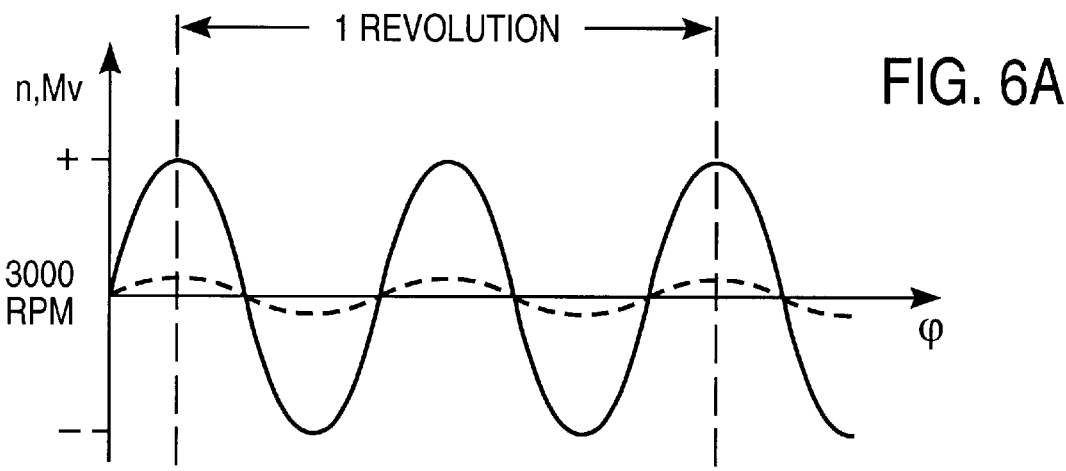
Figure 6B:
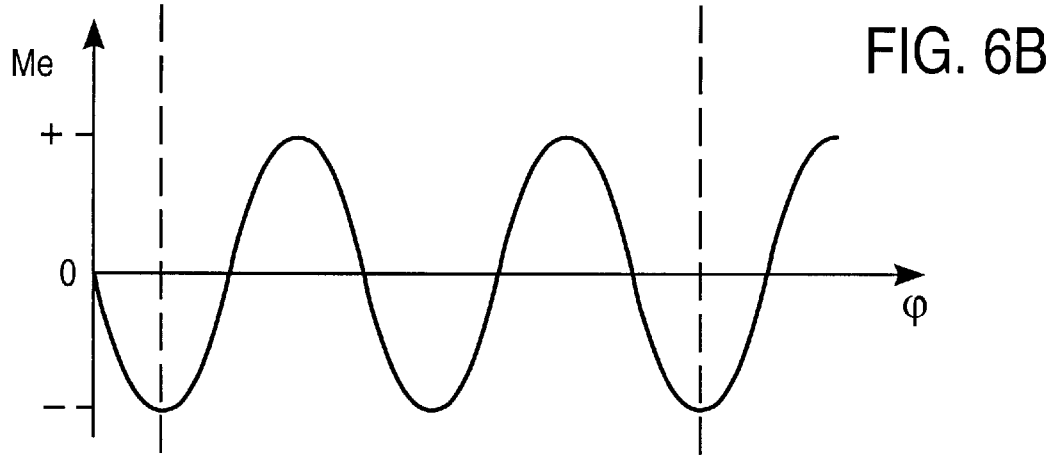
Figure 6C:
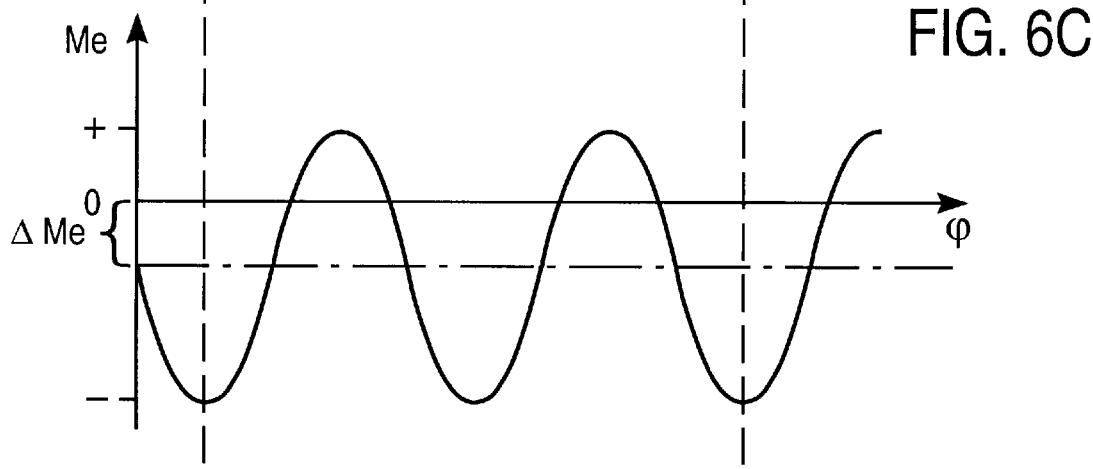

FIGS. 6a–c illustrate the function of reduction of rotational nonuniformity and superpositioning of variable and constant torque.

FIG. 6a shows (by solid line) the rotary speed n of a shaft as a function of the crankshaft angle •. The shaft periodically executes speed fluctuations toward smaller and larger speeds about a mean speed (here, 3000 revolutions per minute), which in this idealized example have a basically sinusoidal appearance. The shaft is, for example, the crankshaft of a four-cylinder, four-stroke internal combustion engine of a motor vehicle, having in the second order (i.e., at a frequency of 100 Hz) a relatively large rotational nonuniformity resulting from the gas and mass forces. As an illustration, the angle interval needed for one revolution of the shaft is also indicated. In general, rotational nonuniformities of higher orders and those of stochastic nature also occur on a shaft (not shown here). Thus, their appearance is generally not sinusoidal.

There are fluctuations in the torque Mv of the engine about a mean torque, basically proportional to the rotational nonuniformities. The solid line in FIG. 6a also illustrates the curve of the engine torque Mv as a function of the crankshaft angle •.

FIG. 6b shows the total torque Me as a function of the shaft angle •, which is applied by an electric machine coupled to the shaft. The curve of the machine torque Me largely corresponds to that of the rotational nonuniformity and the engine torque Mv, but is opposite in direction. That is, when there is a rotational nonuniformity toward higher speed (so-called positive nonuniformity), the electric machine generates a torque to brake the shaft (so-called negative torque), whereas in the case of a rotational nonuniformity toward lower speed (so-called negative nonuniformity) it generates a driving torque (so-called positive torque). The magnitude of the torque Me is chosen such that the rotational nonuniformity—and the fluctuation of the torque Mv proportional to it—is substantially reduced or even virtually disappears through its action, as is illustrated in FIG. 6a by the broken line.

In the mode of operation shown in FIG. 6b, the negative and positive torque extrema are equal in magnitude. Thus, the energy obtained during a braking phase is essentially equal to the energy used up in the following drive phase. Therefore, the outward energy flux is zero, and brake energy is only buffered temporarily inside the system. Thus, the system in this operating mode works like a pure rotational nonuniformity reducer with rapidly varying torque, without generating an additional torque.

An example of an operating mode of the system with superimposed constant torque, modified from the preceding one, is shown in FIG. 6c: The time course of the total torque Me corresponds to that of FIG. 6b, but it is shifted overall by a particular amount • Me (the so-called deviation) in the negative direction. The deviation • Me will generally vary slowly, but in the brief time frame represented here of approximately one period of rotation it is constant to a good approximation. The deviation • Me here is smaller than the amplitude of the rapid variation of the torque, so that the overall torque Me alternately takes on positive and negative values. Averaged over the rapid torque variation, one obtains a constant torque—• Me. Thus, on average, mechanical energy is withdrawn from the internal combustion engine, being largely transformed into electrical energy and taken out of the system. The electrical machine in this type of operation thus has the function of an electrical generator, besides the function of a rotational nonuniformity reducer, which can deliver current, e.g., to counterbalance operating losses of the system, to charge the vehicle's battery, and/or to operate electrical consumers. Similar relationships occur in the case of an electric machine acting as a coupling with a rotary stator: the machine transmits an only slowly varying torque for the coupling function, onto which a rapidly varying torque is superimposed for the reduction of rotational nonuniformity in the takeoff region, as in FIG. 6a.

If the deviation • Me is greater than the amplitude for reducing the rotational nonuniformity, the electric machine will only work as a brake and no longer as a drive, and the braking action will vary in magnitude according to FIGS. 6b and 6c, in opposite phase to the rotational nonuniformity.

Both small and very large generator powers can be adjusted simply by an appropriate adjustment of the (software) control system of the electric machine—without any structural (hardware) changes. Only the size of the electric machine is a limitation. Thus, the very same machine type can be used, for example, for small and large vehicle types without design adaptation.

The overall torque curve can also be shifted in the positive direction (positive deviation). The electric machine then works as a (driving) motor, besides its function as a rotational nonuniformity reducer, to accelerate a transmission element for purposes of synchronization or to support the engine when accelerating the vehicle, for example.

The drive system of a motor vehicle, such as a passenger car, represented in FIG. 7, has as its drive assembly an internal combustion engine 1, which can be a four-cylinder, four-stroke Otto or Diesel motor. The torque produced by the engine 1 can be transferred by a drive train 2 to drive wheels 3. In the takeoff direction, in the drive train 2, there first comes after the engine 1 an electric machine 4, arranged along a drive shaft 10 (here, the crankshaft of the engine 1). This is followed, along a takeoff shaft 55, by a transmission 6 and an axle drive 7, which transfers the torque from the transmission 6 to the drive wheels 3. The transmission 6 can be a shift transmission or an automatic transmission. In other embodiments (not shown), an additional coupling (activated by a control system) is arranged in the drive train 2 between engine 1 and electric machine 4, in order to prevent the engine 1 from following along when braking with the electric machine 4.

The electric machine 4—here, a rotary-current traveling-wave machine in induction or synchronous design—corresponds to the machine shown in FIG. 5 with electrically switching dual stators. It comprises two external stators 8, 8' and an internal brushless rotor 9, which extends in the axial direction across the active surface of both stators 8, 8'. The first stator 8 at the drive end thrusts firmly against the internal combustion engine 1, the vehicle chassis (not shown), or a coupling housing (not shown), whereas the second stator 8' at the drive end is firmly joined to the takeoff shaft 55. The rotor 9 sits directly on the drive shaft 10 or an extension thereof and is firmly coupled to it. The drive shaft 10 and the rotor 9 as well as the takeoff shaft and the rotary stator 8' thus rotate together, without a gearing coming in between. The drive shaft 10 and the takeoff shaft 55, which are separated between the rotor 9 and the rotary stator 8', can be coupled to a positive-locking bridge coupling 60 inside the rotor 9, here, a claw coupling that can be actuated by a control system.

The electric machine 4 fulfills several functions: on the one hand, it functions as an electromagnetic starting and shifting coupling and as an active transmission synchronizer device, as has already been explained in connection with FIGS. 1–5, and thereby replaces a conventional starting clutch and allows the use of a nonsynchronized transmission. On the other hand, it functions as a rotational nonuniformity reducer, as was already discussed in connection with FIG. 6. Furthermore, it functions as a generator to charge the vehicle's battery 11 and to supply electrical consumers and thereby replaces a dynamo normally present in the motor vehicle. Furthermore, the generator function can serve to brake the vehicle or the engine 1. In addition, the electric machine 4 can function as an additional motor ("booster"), e.g., to support the engine when accelerating the vehicle. It also serves as a direct starter for the internal combustion engine and thus can also replace a separate starter normally provided in the motor vehicle. Finally, by virtue of the moment of inertia of the rotor 9, it functions as a flywheel and can thus replace the flywheel generally present on the crankshaft in traditional motor vehicles.

The electric machine 4 is cooled on the inside by a spray fluid cooling 12. After going through a cooler 13 and a pump 14, the cooling fluid—here, a suitable oil—is sprayed onto the rotor 9, and this in proximity to its axis of rotation. Because of the rotation of the rotor and centrifugal force, it travels outwardly, thereby cooling rotor 9 and stators 8, 8', and then exits a housing 15 of the electric machine 4, again returning to the cooler 13 in a closed circuit. Depending on the loss power and rotary speed, the flow of coolant is provided by corresponding control of the pump 14, so that each time only just the required minimum of cooling fluid is present inside the housing 15. An equalization vessel (not shown) allows this variation in the amount of cooling fluid in the housing 15. In other configurations (not shown), the electric machine (or only the rotor) is integrated in a coupling and/or transmission housing and cooled by a lubricating and/or cooling fluid (e.g., clutch or transmission oil) located therein.

Furthermore, the electric machine 4 is outfitted on the drive shaft 10 end with a rotation transformer 16 (so-called resolver), which preferably has more than eight poles, here, for example, 12 poles. It consists of two adjacent circuit boards, one of which is stationary and the other turns with the drive shaft 10. The circuit boards have windings formed by conductor tracks on their facing surfaces, such that a transformer translation ratio dependent on angle of rotation results. The rotation transformer 16 operates on the transponder principle: the stationary windings (stationary board) are actively loaded with current/voltage and give off electromagnetic energy to the rotating windings (rotating board). The latter radiates a portion of this energy back again, and this portion depends on the angle of rotation, given the angle-dependent transmission ratio. The back-radiated portion generates in the stationary windings a signal dependent on angle of rotation. Evaluation of this signal provides the instantaneous angle of rotation of the drive shaft 10 with a precision of at least 0.5 degrees. In more simple configurations, an incremental pickup is used, or no such device is used at all.

An inverter 17 provides, in switching fashion, either the stationary stator 8 or the rotary stator 8' or both in parallel, at a very high clock frequency (e.g., 10–100 kHz), with sine-evaluated pulse width modulated voltage pulses, which under the action of the machine's inductance basically yield sinusoidal three-phase currents, whose amplitude, frequency and phase are freely selectable. The feeding to the rotary stator 8' occurs via rotary contacts, here, wipers/slip ring contacts.

The inverter 17 is a voltage intermediate-circuit pulse inverter and comprises three subassemblies: a dc voltage converter 18 (input assembly), which converts dc voltage from a low level (here, 12 V) to a higher intermediate circuit level (here, 60 V or 350 V) or back again, an electrical intermediate circuit accumulator 19, here, a capacitor or an arrangement of parallel-switched capacitors, and a machine inverter 21 (output assembly), which can generate from the intermediate circuit dc voltage the (synchronized) three-phase alternating voltage of variable amplitude, frequency and phase or—when the electric machine 4 is operating as a generator—can convert any such alternating voltages into the intermediate-circuit dc voltage. In other configurations (not shown), the intermediate circuit level lies at the upper edge of the low-voltage range that is permitted without special electrocution protection, here, 60 V.

The three subassemblies 18, 19, 20 of the inverter 17 are hermetically enclosed in a metal housing 21, which is filled with a suitable boiling type coolant. This is, for example, a fluorohydrocarbon, having a suitable boiling point, e.g., 60° C., at a suitable pressure (say, between 50 mbar and 3 bar). Evaporated coolant can condense in a condensation cooler 22 and return to the housing 21 in liquid form in a closed circuit. The housing 21 with the cooling circuit is hermetically tight.

The dc voltage converter 18 is connected, at the low-voltage side, with the vehicle's battery 11 and various low-voltage consumers 23, such as lighting and electronic devices. The inverter 17, on the one hand, can furnish current at low voltage level for charging the vehicle's battery 11 and supplying the low-voltage consumers 23, and on the other hand it can take current from the vehicle's battery 11 at low voltage level for starting the internal combustion engine 1. In other configurations (not shown), the vehicle's battery is at intermediate circuit level and coupled directly to the intermediate circuit.

The intermediate circuit accumulator 19 is connected to an external additional accumulator 24, which can be an electrical accumulator, here, an extra capacitance 25, and/or a flywheel accumulator 26. The additional accumulator 24 has the primary task of buffering the energy obtained from the rotational nonuniformity reducer in a brake phase and surrendering it again for the following drive phase. In addition, it also serves to save that energy which accrues during starting (i.e., slip energy), during brake synchronization, and during other brake processes mediated by the electric machine 4. This energy can be reused, e.g., for corresponding functions which require energy. Finally, it can take strain off the vehicle's battery 11 when starting the engine 1, since it takes away energy only slowly and saves it in the additional accumulator 24. Here, it is then available for fast removal during the starting process.

On the other hand, the (inner) intermediate circuit accumulator 19 has the basic task of providing voltage with the necessary steep rise time for clock purposes—i.e., quickly—to the machine-inverter group 20. It does not need any very high capacitance for this (e.g., it has 2 • F), and in fact low lead inductances are more advantageous for speed purposes, which is ensured by the arrangement in the interior of the inverter 17 (and preferably on the same board on which the electronic switches of the machine-inverter 20 are also arranged). The additional accumulator 24, on the other hand, can work relatively slowly, so that the lead capacitances here are not a problem, due to the external arrangement. In particular, the additional capacitance 25 can be 50–10,000 times greater than that of the intermediate circuit accumulator 19 (here, it is 4.7 mF, for example, for furnishing the rotational nonuniformity energy).

Even larger storage capacities can be achieved with the flywheel accumulator 26, which here comprises its own inverter-controlled electric machine 27 and a gyrating mass 28 coupled to it. The latter can be formed by a separate flywheel or be integrated in the rotor of the electric machine 27. The moment of inertia of the gyrating mass 28 is preferably 0.05 to 2 kgm$^2$. It is also possible to store a multiple of the energy needed to start the engine 1 in the flywheel accumulator 26 and quickly remove the particular energy needed for starting from it (i.e., in less than 1 second).

In other configurations (not shown), no separate additional accumulator 24 is provided. Here, the intermediate circuit accumulator 19 is dimensioned and possibly arranged outside the inverter 17 so that it can take on the function of the additional accumulator 24.

When starting with large clutch slip, the power put out by the engine 1 is generally much greater than that put out by the drive wheels 3. For the case when the storage capacity and/or power is not enough to take up the differential energy or power, an electrical resistor 124 is provided to turn a portion of the total differential power into heat. It is connected electrically to the intermediate circuit by a control unit (not shown). Thermally, it is coupled by the cooling circuit to the engine 1.

The intermediate circuit with its high voltage level (here, 350 V) supplies various high-power consumers, such as an air conditioner 29 and servo-drives 30 with electrical energy. Whereas such high-power consumers are traditionally operated by mechanical coupling from the internal combustion engine 1, the high-voltage level available here allows a more efficient, purely electrical powering.

A control device 31 determines which stator 8, 8' to actuate and, through appropriate actuation of its semiconductor switches, instructs the inverter 17 at each moment of time as to the amplitude, frequency, and phase that the alternating voltage generated by it should have. The control device 31, which can be formed, for example, by a correspondingly programmed microcomputer system, first determines the magnitude and the direction of the torque which the electric machine 4 is supposed to produce at a particular time. It can do this, e.g., by means of memorized characteristic diagram values, which represent as a function of time the nominal torque (or the nominal clutch slip) for the different operating states for coupling processes and the nominal rotary speed for transmission synchronization processes. If necessary, the determination of torque can be supplemented by an ongoing measurement of these quantities and a feedback control, which ensures that the value settings are maintained. For the reduction of rotational nonuniformities, the control unit 31 can determine the magnitude and the direction of the torque to be produced by means of a characteristic diagram control system, in that it obtains, as input information from the rotation transformer 16, the angular position of the drive shaft 10, the mean rotary speed at the moment, and possibly other operating parameters, such as the throttle valve position, and it determines from a memorized characteristic diagram the rotational nonuniformity to be expected at the moment, as a function of these operating parameters. Another possibility is to determine the rotational nonuniformity actually existing at the time, for example, by computing the instantaneous rotational velocity on the basis of information furnished by the rotation transformer 16 and/or by evaluating the gas pressures existing in the engine 1 at the time, which can be detected by means of gas pressure sensors 32, and also by picking up the instantaneous torque of the engine 1 by means of a torque hub (not shown) in the drive train. A combination of automatic and open-loop control is also possible. From the value thus determined for the instantaneous rotational nonuniformity, a corresponding (opposite-phase) value is derived for the rapidly changing nominal torque of the electric machine 4, onto which may be additively superimposed a positive or negative additional torque of desired strength. To start the internal combustion engine 1, the nominal torque can be determined on the basis of memorized values, which specify the nominal time curve of the rotary speed or torque of the electric machine 4 during the starting process, perhaps supplemented by a measurement of these quantities and a feedback control, which ensures that the preset values are maintained.

In a second step, the control device 31 determines which amplitude, frequency, and phase of the voltage or current must be provided by the inverter 17 in order for the electric machine 4 to produce this nominal overall torque. This determination is done, in electrical induction machines, on the basis of a field-oriented automatic control, which is based on a model computation for the electric machine 4 and which uses as input information essentially the measurable electrical quantities of the stator (amplitude, frequency an d phase of current and voltage) and the instantaneous mean speed of the rotor.

FIG. 7, the control device 31 is shown as being arranged outside the inverter housing 21. In order to keep the lead inductances low and also participate in the boiling bath cooling, however, it is arranged inside the inverter housing 21 in other configurations (not shown).

The control device 31 shares various sensors serving to carry out its control tasks and sensor information derived from them with a motor control unit 33 to control the engine 1. Specifically, these are, for example, the rotation transformer 16 (angle position pickup), the gas pressure sensors 32, as well as sensors (not shown) for detecting the mean rotary speed, the loading condition of the engine 1 (e.g., through the throttle valve position) and its torque (e.g., through a torque hub), as well as the rotary speed of the axle drive 7 and the gear which is engaged.

Furthermore, the control device 31 communicates with a number of other control units: an energy consumption control unit (not shown) indicates how much energy is needed for charging the vehicle battery 1, for supplying the low-voltage consumers 23 and the high-power consumers 29, 30, so that the control device 31 can provide for a corresponding overall thrust adjustment • Me (see FIG. 6c). The motor control unit 33 tells the control device 31 whether the electric machine 4 is supposed to provide acceleration or braking of the vehicle in addition to its coupling and synchronization function as well as the vibration diminishing function, so that it can provide a corresponding overall thrust shift • Me and perhaps temporarily switch off the rotational nonuniformity reduction function. Accordingly, an ASR (drive slip control) control unit 34 tells the control device 31, when drive slip is present, that the electric machine 4 should temporarily increase the clutch slip or act as a generator brake, if necessary before the ASR control unit institutes a braking of the particular drive wheels by the wheel brakes as a more massive remedy if the drive slip continues. In addition, the ASR control unit can relay its slip information to the motor control unit 33, to bring about a further reduction in the engine torque. The motor control unit 33 can also implement an automatic start-stop control and tell the control device 31 whether the electric machine 4 should start the engine 1.

Energy obtained during each type of braking is kept—as much as is possible—in the additional accumulator 24, to be re-used for subsequent powering of the electric machine 4 or diverted to the vehicle battery 11. Surplus energy is turned into heat in the resistor 124.

The electric machine 4, shown more closely in FIG. 8, has an outer diameter of around 250 mm and a length in axial direction of 55 mm and produces a continuous torque of around 50 Nm and a peak torque of around 150 Nm with a weight of 10–15 kg. It can attain rotary speeds corresponding to the peak speed of conventional internal combustion engines (around 6000 to 10,000 rpm) and is speed-resistant up to 14,000 rpm. The electric machine 4 has an exterior stator 8 (for simplicity, only one stator is shown here, the same remarks apply to the other one), having grooves 35 in the direction of the drive shaft 10 (axial direction). The stator 8 carries a three-phase winding 36, configured such as to form 12 poles when energized with three-phase current. There are three grooves 35 per pole, and thus a total of thirty-six grooves 35. (In other configurations (not shown), at least six grooves per pole, preferably nine grooves, are present in order to reduce stray effects.) The poles revolve in circular motion in the stator 8 with the rotary-current oscillation. Their momentary position at a particular time is shown by arrows carrying the designations "S" (for South Pole) and "N" (for North Pole). A back 37 closing off the grooves 35 on the outside is relatively thin in radial direction, its thickness being preferably 3–25 mm (at the location of a groove 35). The stator 8 is constructed from thin plates (the thickness here is 0.25 mm) of a material with low remagnetization losses (here, less than 1 W/kg at 50 Hz and one Tesla), with the planes of the plates being perpendicular to the axial direction.

The interior rotor 9 in the case of the induction machine is fashioned as a squirrel-cage rotor with cage bars traveling essentially in the axial direction, each of them being joined at the end face to a short-circuit ring 38. In the case of the synchronous machine, the rotor 9 carries a corresponding number of poles to the stator 8 (here, 12 poles), which can be formed by permanent magnets or appropriately excited coils. FIG. 8 also shows the synchronous machine, schematically indicating its rotor poles (reference number 39).

The air gap 40 between rotor 9 and stator 8 is relatively large; its width is 0.25 to 2.5 mm, preferably 0.5 to 1.5 mm.

In other configurations (not shown), the rotor is exterior and the stator is interior.

In the configuration per FIG. 9, a friction-closing coupling 5, serving as a starting and shifting clutch, is integrated in an electric machine 4 with only one (stationary) stator 8. In this embodiment, the electric machine 4 has a synchronizer function, but no electromagnetic coupling function. Inside the stator 8, firmly mounted for example on the engine or transmission housing, the rotor 9 is firmly joined at one end by its periphery to the drive shaft 10 of the internal combustion engine 1 by means of an axially and laterally protruding cage 54. The rotor 9 is hollow on the inside and essentially has the form of a flat round cylinder. The coupling 5—here, a multidisk (multisurface frictional disk clutch) coupling—is arranged in the cavity. This can provide a frictional connection between the drive shaft 10 with the rotor 9 and a takeoff shaft 55 to the transmission 6, protruding into the cavity. For this, the rotor 9 has internal gearing and the takeoff shaft 55 has external gearing in the area of the cavity 55. In the space in between is arranged a set of disks 56, whose disks 57 are alternately externally and internally geared, so that one disk is frictionally joined to the rotor 9 (outer disk 57*a*) and the next disk is joined to the takeoff shaft 55 (inner disk 57*b*) in alternating manner. Without axial pressure, the outer and inner disks 57*a*, 57*b* can rotate almost freely against each other, and the shafts 10, 55 are then decoupled. If one pushes together the outer and inner disks 57*a*, 57*b* by means of a pressure device (not shown) (for example, an angled lever) in the axial direction, the resulting frictional forces provide the connection between the shafts 10, 55, so that the torque generated by the engine 1 and the electric machine 4 is transmitted to the takeoff shaft 55. The frictional connection piece (i.e., the set of disks 56 here) of the clutch 5 is entirely accommodated in the rotor 9, and thus does not protrude from it sideways in the axial direction. The clutch 5 is designed as a wet clutch. The clutch oil simultaneously serves to cool the electric machine 4. In other configurations (not shown), other shiftable frictional clutches are integrated, e.g., a single-disk clutch in wet or dry design.

In corresponding fashion, in other embodiments (not shown) with electromagnetic coupling function, a mechanical bridge clutch is integrated into the electric machine. A difference from FIG. 9 then consists, e.g., only in that the takeoff shaft 55 is firmly joined to the (now rotating) stator 8.

FIG. 10 shows a schematic diagram of the inverter 17. One recognizes the intermediate circuit accumulator 19 in the form of a capacitor, which is switched in parallel to the additional accumulator 24 (not shown more closely here), as well as the resistor. The capacitor and the resistor symbolize possibly parallel connections of several capacitors or resistors.

The machine inverter 20 is formed by three parallel-connected (but independently engaging) switch groups 42, each of the switch groups 42 being responsible for generating one of the three 3-phase voltages. Each of the switch groups 42 is a series connection of two (independently switching) switches 43 between the plus and the minus pole of the intermediate circuit. The series connection is joined at the center (i.e., between the switches 43) by one side to one of the three windings 36*a*, 36*b*, 36*c* of the three-phase winding 36; at the other side, the three windings 36*a*, 36*b*, 36*c* are joined together.

A free-wheeling diode 44 is connected in parallel to each of the switches 43. It is polarized such that it normally blocks and only when the opposite switch is open does it let through a brief current flow in the other direction, generated by self-inductance.

Each switch 43 symbolizes a parallel connection of several (e.g., five) MOS field-effect transistors, which are directly actuated by the control device 31 to form a three-phase current of desired amplitude, frequency and phase.

The dc voltage converter 18 comprises two subassemblies, namely, one which can bring electrical energy from the low voltage level (12 V) up to the high intermediate-circuit voltage level (60 V or 350 V), and another which can bring electrical energy from the high voltage level (60 V or 350 V) to the low voltage level (12 V). The first-mentioned subassembly can be absent from configurations with vehicle battery arranged in the intermediate circuit.

The first subassembly is, for example, a step-up transformer 45. This is formed by a series circuit of an inductance 46, connected to the plus pole of the vehicle's battery 11, and a switch 47 connected to its minus pole and the minus pole of the intermediate circuit, this series circuit being connected in the middle to the plus pole of the intermediate circuit via a step-up diode 48 (polarized in the conducting direction). When the switch 47 is closed, a circular current flows from the plus to the minus pole of the vehicle battery 11. After opening the switch 47, a self-inductance voltage tries to prevent a collapse of this current, with the result that the high intermediate-circuit voltage level (60 V or 350 V) is temporarily exceeded and current flows through the (otherwise blocking) step-up diode 48 and charges the intermediate-circuit accumulator 19. By periodically opening and closing the switch 47, one achieves a quasistationary charging current, e.g., in preparation of the starting process. The switch 47 is a semiconductor switch, which is directly actuated by the control device 31.

The second subassembly is a step-down voltage transformer 49, for example, which functions similar to a switching power pack. It comprises two series circuits of switches 50 between the plus and minus pole of the intermediate circuit, each of them with parallel-connected free-wheeling diodes 51. The ends of a primary winding of a high-frequency (HF) transformer 52 are each connected to the middle of these series circuits. The secondary winding of the HF transformer 52 energizes a rectifying and smoothing unit 53, which in turn energizes the vehicle battery 11 and possibly low-voltage consumers 23. The switches 50 symbolize semiconductor switches, which are directly actuated by the control device 31. By periodically opening and closing the switches, a high-frequency alternating current can be generated, which induces in the secondary winding of the HF transformer 52 a corresponding alternating voltage at lower voltage level, which is rectified and smoothed out by the unit 53. The exact value of the resulting dc voltage can be precisely adjusted by means of the switch 50, through varying the switching frequency.

We claim:

1. A drive system for a motor vehicle, comprising
   a combustion engine (1) as the drive system,
   a drive train (2) for torque transmission from the combustion engine (1) to drive wheels (3), with a drive shaft (10) driven by the combustion engine (1) and an output shaft (55),
   a lock-up clutch (60) between the drive shaft (10) and the output shaft (55),
   in the drive train (2), an electrical machine (4) which has at least two electromagnetic active units—a rotor (9) and a stator (8),
   wherein the rotor (9) is connected with one of the two shafts—the output shaft (55) or the drive shaft (10)—in a rotationally fixed manner and the lock-up clutch (60) is arranged between the rotor (9) and the other of the two shafts (10 or 55, respectively), thereby rotating together with such shaft (10 or 55, respectively), and
   wherein the stator (8,8') is provided as a double unit whose i) first partial unit (8') is coupled in a rotationally fixed manner with the other of the two shafts (10 or 55, respectively), thereby rotating together with such shaft (10 or 55, respectively), and ii) whose other partial unit (8) is not coupled with the other of the two shafts (10 or 55, respectively) and is thereby fixed against rotation, wherein always one of the two partial units (8', 8) is electromagnetically activated and the other deactivated, and wherein in case the first partial unit (8') is active and the lock-up clutch (60) is open, the combustion engine (1) transfers its torque to the drive wheels (3) via the electrical machine (4), with the latter then acting as an electromagnetic clutch, wherein, in case the second partial unit (8') is active, the combustion engine (1) transfers its torque via the then closed lock-up clutch (60) to the drive wheels (3), with the electrical machine (4) additionally applying torque to the then connected drive and output shafts (10, 55).

2. A drive system for a motor vehicle, comprising
a combustion engine (1) as the drive system,
a drive train (2) for torque transmission from the combustion engine (1) to drive wheels (3) by means of a drive shaft (10) driven by the combustion engine (1) and an output shaft (55),
a lock-up clutch (60) between the drive shaft (10) and the output shaft (55),
an electrical machine (4) in the drive train (2) having at least two electromagnetic active units—a rotor (9) an a stator (8),
wherein the rotor (9) is connected with one of the two shafts—the output shaft (55) or the drive shaft (10)—in a rotationally fixed manner and the lock-up clutch (60) is arranged between the rotor (9) and the other of the two shafts (10 or 55, respectively), and
wherein the stator (8) is either
i) in a first coupling state in which it is coupled with the other of the two shafts (10 or 55, respectively) in a rotationally fixed manner, thereby rotating together with such shaft (10 or 55, respectively), or
ii) in another coupling state in which it is disengaged from the other of the two shafts (10 or 55, respectively) and fixed against rotation,
wherein the combustion engine (1) transfers its torque in the first coupling state and in case the lock-up clutch (60) is open to the drive wheels (3) via the electrical machine (4), with the latter then acting as an electromagnetic clutch, wherein, in the other coupling state, the combustion engine (1) transfers its torque via the then closed lock-up clutch (60) to the drive wheels (3), with the electrical machine (4) additionally applying torque to the then connected drive and output shafts (10, 55).

3. A drive system according to claim 2 wherein additional torque applied by the electrical machine (4) is a constant positive or negative or a varying torque.

4. A drive system according to claim 2 wherein the transition from the first to the other coupling state of the stator (8) is achieved by opening a clutch (63) between the stator (8) and the other of the two shafts (10 or 55, respectively) and closing a clutch (64) between the stator (8) and a housing (61).

5. A drive system according to claim 2 wherein the electrical machine (4) acts as a starter and/or transmission clutch.

6. A drive system according to claim 2 wherein the electrical machine (4) acts as a flywheel mass starter with an electromagnetically couplable flywheel mass.

7. A drive system according to claim 2 wherein the electrical machine (4) acts as an active transmission synchronization device.

8. A drive system according to claim 2 wherein the electrical machine (4) is a rotating field machine or a traveling field machine.

9. A drive system according to claim 2 comprising at least one inverter (17) to produce the voltages and/or currents with variable frequency, amplitude and/or phase required for the magnetic fields of the machine (4).

10. A drive system according to claim 2 wherein the electrical machine (4) has the additional function of actively reducing rotational fluctuations.

11. A drive system according to claim 10 wherein the electrical machine (4) produces a rapidly varying torque, i.e. a variable torque, which is in particular an alternating torque.

12. A drive system according to claim 11 wherein the electrical machine (4) superimposes the variable torque over a positive or negative torque, i.e. a constant torque.

13. A drive system according to claim 11 wherein the energy gained through clutch slip or the other decelerating constant torque and/or the energy gained during reduction of a positive rotational fluctuation is at least partially stored and reused.

14. A drive system according to claim 2 wherein the electrical machine (4) has the function of a direct starter and/or of a power supply generator.

15. A drive system according to claim 2 wherein the electrical machine (4) has a high torque density, compared with the maximum torque, in excess of $0.01 \text{ Nm/cm}^3$.

16. A drive system according to claim 2 wherein, in the electrical machine (4), a mechanical clutch is integrated.

17. A drive system according to claim 2 with an acceleration slip control wherein the electrical machine (4) is arranged in such a way that drive slip reduction can be achieved by reducing the drive torque, i.e. by braking action and/or clutch slip action.

18. A procedure to operate a drive system for a motor vehicle, with a combustion engine (1) as the drive system, a drive train (2) for torque transmission from the combustion engine (1) to drive wheels (3), having a drive shaft (10) driven by the combustion engine (1) and an output shaft (55), with the following characteristics:

a lock-up clutch (60) is arranged between the drive shaft (10) and the output shaft (55), in the drive train (2), an electrical machine (4) is arranged which has at least two electromagnetic active units—a rotor (9) and a stator (8), wherein the rotor (9) is connected with one of the two shafts—the output shaft (55) or the drive shaft (10)—in a rotationally fixed manner and the lock-up clutch (60) is positioned between the rotor (9) and the other of the two shafts (19$^1$ or 55, respectively), and the stator (8) is operated either
i) in a first coupling state in which it is coupled with the other of the two shafts (10 or 55 respectively) in a rotationally fixed manner, thereby rotating together with such shaft (10 or 55, respectively), or
ii) in another coupling state in which it is uncoupled from the other of the two shafts (10 or 55, respectively) and fixed against rotation, wherein the combustion engine (1) transfers its torque in the first coupling state and in case the lock-up clutch

(60) is open to the drive wheels (3) via the electrical machine (4), with the latter then acting as an electromagnetic clutch, wherein, in the other coupling state, the combustion engine (1) transfers its torque via the then closed lock-up clutch (60) to the drive wheels (3), with the electrical machine (4) additionally applying torque to the then connected drive and output shafts (10, 55).

19. A procedure for operating a drive system for a motor vehicle, comprising a combustion engine (1) as the drive system, a drive train (2) for torque transmission from the combustion engine (1) to drive wheels (3) with a drive shaft (10) driven by the combustion engine (1) and an output shaft (55), with the following characteristics:

a lock-up clutch (60) is arranged between the drive shaft (10) and the output shaft (55), in the drive train (2), an electrical machine (4) is arranged which has at least two electromagnetic active units—a rotor (9) and a stator (8), wherein the rotor (9) is connected with one of the two shafts—the output shaft (55) or the drive shaft (10)—in a rotationally fixed manner and the lock-up clutch (60) is arranged between the rotor (9) and the other of the two shafts (10 or 55, respectively), and wherein the stator (8,8') is provided as a double unit whose
  i) first partial unit (8') is coupled in a rotationally fixed manner with the two shafts (10 or 55, respectively), and
  ii) whose other partial unit (8) is not coupled with the other of the two shafts (10 or 55, respectively) and rather fixed against rotation, wherein always one of the two partial units (8', 8) is electromagnetically activated and the other deactivated, and wherein in case the first partial unit (8') is active and the lock-up clutch (60) is open, the combustion engine (1) transfers its torque to the drive wheels (3) via the electrical machine (4), with the latter then acting as an electromagnetic clutch, wherein, in case the second partial unit (8') is active, the combustion engine (1) transfers its torque via the then closed lock-up clutch (60) to the drive wheels (3), with the electrical machine (4) additionally applying torque to the then connected drive and output shafts (10, 55).

\* \* \* \* \*